United States Patent
Kamen et al.

(10) Patent No.: US 6,381,958 B1
(45) Date of Patent: May 7, 2002

(54) STIRLING ENGINE THERMAL SYSTEM IMPROVEMENTS

(75) Inventors: Dean L. Kamen, Bedford, NH (US); Thomas Q. Gurski, Lawrence, MA (US); Christopher C. Langenfeld, Nashua, NH (US); Ryan Keith LaRocque, Groton, MA (US); Michael Norris, Manchester; Kingston Owens, Bedford, both of NH (US)

(73) Assignee: New Power Concepts LLC, Manchester, NH (US)

( * ) Notice: Subject to any disclaimer, the term of this patent is extended or adjusted under 35 U.S.C. 154(b) by 0 days.

(21) Appl. No.: 09/517,245

(22) Filed: Mar. 2, 2000

Related U.S. Application Data

(63) Continuation-in-part of application No. 09/115,383, filed on Jul. 14, 1998, and a continuation-in-part of application No. 09/115,381, filed on Jul. 14, 1998
(60) Provisional application No. 60/052,535, filed on Jul. 15, 1997.

(51) Int. Cl.[7] ................................................. F01B 29/10
(52) U.S. Cl. .............................. 60/517; 60/523; 60/524
(58) Field of Search ......................... 60/517, 520, 523, 60/524, 526

(56) References Cited

U.S. PATENT DOCUMENTS

| | | | |
|---|---|---|---|
| 2,595,457 A | 5/1952 | Holm et al. ................. | 257/245 |
| 2,688,228 A | 9/1954 | DeBrey et al. | |
| 3,859,794 A | 1/1975 | Hakansson | |
| 4,172,363 A | 10/1979 | Bex ............................. | 60/517 |
| 4,231,222 A | 11/1980 | Fenton | |
| 4,416,114 A | 11/1983 | Martini ........................ | 60/526 |
| 4,527,394 A | 7/1985 | Corey ......................... | 60/517 |
| 4,881,372 A * | 11/1989 | Naito ........................... | 50/521 |
| 5,441,401 A * | 8/1995 | Yamaguro et al. ......... | 60/517 X |
| 5,743,091 A | 4/1998 | Penswick et al. ............. | 60/517 |
| 5,755,100 A * | 5/1998 | Lamos ........................ | 60/521 |
| 5,878,570 A | 3/1999 | Reithofer ..................... | 60/520 |
| 5,987,886 A * | 11/1999 | Sekiya et al. ................. | 60/523 |

FOREIGN PATENT DOCUMENTS

| | | |
|---|---|---|
| DE | 8411960 U | 8/1988 |
| DE | 3734009 A1 | 4/1989 |
| DE | 4219583 A1 | 12/1993 |
| FR | 1 063 612 A | 5/1954 |
| GB | 395374 | 7/1933 |
| GB | 689 484 A | 3/1953 |
| IT | 500313 | 11/1954 |
| JP | 56-133597 | 10/1981 |
| JP | 58-25556 | 2/1983 |
| WO | WO 99/40309 | 8/1999 |

OTHER PUBLICATIONS

Chen et al., "Hardware Development and Initial Subassembly Tests of a Gas–Fired Stirling Engine/Refrigerant Compressor Assembly", Proceedings of the 25th Intersociety Energy Conversion Engineering Conference, vol. 5, Aug. 12–17, 1990.

(List continued on next page.)

*Primary Examiner*—Hoang Nguyen
(74) *Attorney, Agent, or Firm*—Bromberg & Sunstein LLP

(57) ABSTRACT

A thermal cycle engine having a heat exchanger for transferring thermal energy across the heater head from a heated external fluid to the working fluid. The heat exchanger has a set of heat transfer pins each having an axis directed away from the cylindrical wall of the expansion cylinder, or, alternatively, a set of fins substantially aligned with the axis of the expansion cylinder. The height and density of the heat transfer pins may vary with distance in the direction of the flow path, and the pin structure may be fabricated by stacking perforated rings in contact with a heater head. A ring burner supplements the main combustor for supplying additional fuel to cause additional combustion of the exhaust gas. A regenerator for the thermal cycle engine has a random network of fibers formed to fill a specified volume and a material for cross-linking the fibers at points of close contact between fibers of the network.

12 Claims, 19 Drawing Sheets

OTHER PUBLICATIONS

Hargreaves, *The Philips Stirling Engine*, pp. 214–215, 1991.

Lane et al., "A Biomass–Fired 1 kWe Stirling Engine Generator and Its Applications in South Africa," $9^{th}$ International Stirling Engine Conference, South Africa, Jun. 2–4, 1999, http://www.sunpower.com/tech_papers/pub76/isec99.html.

International Search Report, PCT/US 98/14586, filed Jul. 14, 1998.

International Search Report, PCT/US 98/14559, filed Jul. 14, 1998.

* cited by examiner

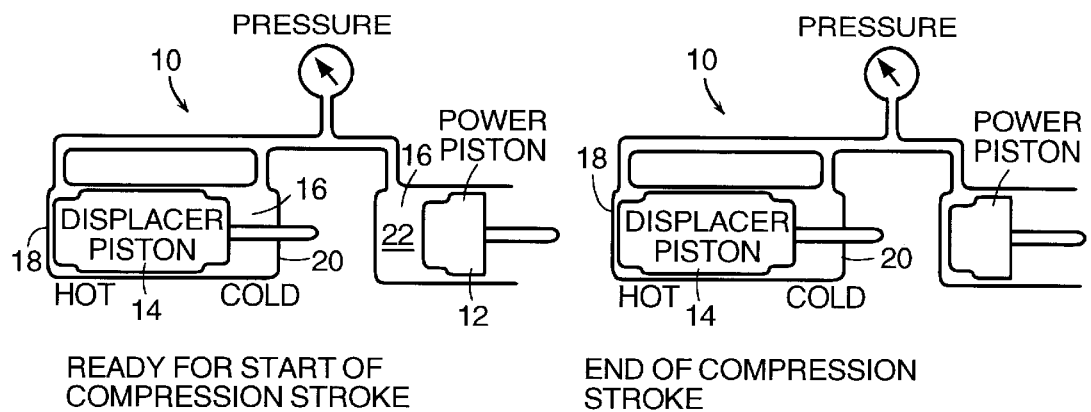
FIG. 1a
PRIOR ART
READY FOR START OF COMPRESSION STROKE
FIG. 1b
PRIOR ART
END OF COMPRESSION STROKE
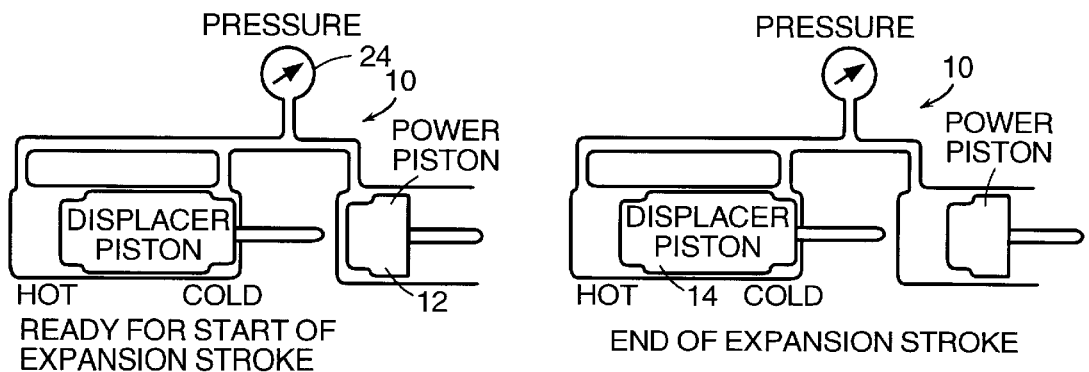
FIG. 1c
PRIOR ART
READY FOR START OF EXPANSION STROKE
FIG. 1d
PRIOR ART
END OF EXPANSION STROKE
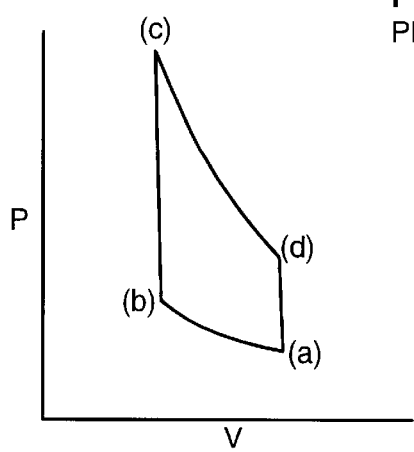
FIG. 1e
PRIOR ART

STIRLING ENGINE THERMAL SYSTEM IMPROVEMENTS

The present application is a continuation-in-part of U.S. applications, Ser. No. 09/115,383, filed Jul. 14, 1998, and Ser. No. 09/115,381, filed Jul. 14, 1998, and claims priority from U.S. provisional application No. 60/052,535, filed Jul. 15, 1997, all of which applications are herein incorporated by reference.

TECHNICAL FIELD

The present invention pertains to improvements to thermal components of a Stirling cycle heat engine and more particularly to the heater head and combustion chamber assembly and regenerator.

BACKGROUND OF THE INVENTION

Stirling cycle machines, including engines and refrigerators, have a long technological heritage, described in detail in Walker, *Stirling Engines*, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression.

Additional background regarding aspects of Stirling cycle machines and improvements thereto are discussed in Hargreaves, *The Phillips Stirling Engine* (Elsevier, Amsterdam, 1991) and in co-pending U.S. patent applications Ser. No. 09/115,383, filed Jul. 14, 1998, and Ser. No. 09/115,381, filed Jul. 14, 1998, which reference and both of which applications are herein incorporated by reference.

The principle of operation of a Stirling engine is readily described with reference to FIGS. 1a–1e, wherein identical numerals are used to identify the same or similar parts. Many mechanical layouts of Stirling cycle machines are known in the art, and the particular Stirling engine designated generally by numeral 10 is shown merely for illustrative purposes. In FIGS. 1a to 1d, piston 12 and a displacer 14 move in phased reciprocating motion within cylinders 16 which, in some embodiments of the Stirling engine, may be a single cylinder. A working fluid contained within cylinders 16 is constrained by seals from escaping around piston 12 and displacer 14. The working fluid is chosen for its thermodynamic properties, as discussed in the description below, and is typically helium at a pressure of several atmospheres. The position of displacer 14 governs whether the working fluid is in contact with hot interface 18 or cold interface 20, corresponding, respectively, to the interfaces at which heat is supplied to and extracted from the working fluid. The supply and extraction of heat is discussed in further detail below. The volume of working fluid governed by the position of the piston 12 is referred to as compression space 22.

During the first phase of the engine cycle, the starting condition of which is depicted in FIG. 1a, piston 12 compresses the fluid in compression space 22. The compression occurs at a substantially constant temperature because heat is extracted from the fluid to the ambient environment. The condition of engine 10 after compression is depicted in FIG. 1b. During the second phase of the cycle, displacer 14 moves in the direction of cold interface 20, with the working fluid displaced from the region of cold interface 20 to the region of hot interface 18. This phase may be referred to as the transfer phase. At the end of the transfer phase, the fluid is at a higher pressure since the working fluid has been heated at constant volume. The increased pressure is depicted symbolically in FIG. 1c by the reading of pressure gauge 24.

During the third phase (the expansion stroke) of the engine cycle, the volume of compression space 22 increases as heat is drawn in from outside engine 10, thereby converting heat to work. In practice, heat is provided to the fluid by means of a heater head 100 (shown in FIG. 2) which is discussed in greater detail in the description below. At the end of the expansion phase, compression space 22 is full of cold fluid, as depicted in FIG. 1d. During the fourth phase of the engine cycle, fluid is transferred from the region of hot interface 18 to the region of cold interface 20 by motion of displacer 14 in the opposing sense. At the end of this second transfer phase, the fluid fills compression space 22 and cold interface 20, as depicted in FIG. 1a, and is ready for a repetition of the compression phase. The Stirling cycle is depicted in a P-V (pressure-volume) diagram as shown in FIG. 1e.

Additionally, on passing from the region of hot interface 18 to the region of cold interface 20, the fluid may pass through a regenerator 134 (shown in FIG. 2). Regenerator 134 is a matrix of material having a large ratio of surface area to volume which serves to absorb heat from the fluid when it enters hot from the region of hot interface 18 and to heat the fluid when it passes from the region of cold interface 20.

Stirling cycle engines have not generally been used in practical applications due to several daunting engineering challenges to their development. These involve such practical considerations as efficiency, lifetime, and cost. The instant invention addresses these considerations.

SUMMARY OF THE INVENTION

In accordance with preferred embodiments of the present invention, there is provided a thermal cycle engine of the type having a piston undergoing reciprocating linear motion within an expansion cylinder containing a working fluid heated by heat from an external source that is conducted through a heater head. The thermal cycle engine has a heat exchanger for transferring thermal energy across the heater head from a heated external fluid to the working fluid, the heat exchanger comprising a set of heat transfer pins, wherein each heat transfer pin has an axis directed away from the cylindrical wall of the expansion cylinder. In accordance with alternate embodiments of the invention, the axis of each heat transfer pin may be substantially perpendicular to the cylindrical wall of the expansion cylinder. In accordance with further alternate embodiments of the invention, the heat exchanger may comprise a set of fins substantially aligned with the axis of the expansion cylinder. The thermal cycle engine may further include a plurality of dividing structures for spatially separating the set of heat transfer pins into subsets of heat transfer pins, and the heat transfer pins of each subset of heat transfer pins may have axes that are substantially parallel to each other.

In accordance with other embodiments of the invention, a subset of the set of heat transfer pins, up to the entirety thereof, may include heat transfer pins extending from the heater head into the external fluid. A pin backer may be provided for guiding the heated external fluid past the set of heat transfer pins. A dimension of the pin backer perpendicular to the heater head may decrease in the direction of the flow path, and the surface area of the heat transfer pins transverse to the flow path may increase in the direction of the flow path. The heat transfer pins may have a population density that increases in the direction of the flow path, and the height and density of the heat transfer pins may vary with distance in the direction of the flow path.

In accordance with another aspect of the present invention, a method is provided for manufacturing a heat exchanger for transferring thermal energy across a heater head from a heated external fluid to the working fluid. The method has the steps of casting at least one array of heat transfer pins integrally cast onto a panel, bonding the array of heat transfer pins to the heater head. The step of bonding may include mechanically attaching the panel to the heater head and may also include brazing the panel of the array of heat transfer pins to the heater head.

A method for manufacturing a heat exchanger in accordance with further embodiments of the invention provides the steps of fabricating a plurality of perforated rings, stacking the perforated rings in contact with a heater head, and bonding the perforated rings to the heater head. The step of fabricating may include stamping the rings out of a sheet of metal.

In accordance with yet a further aspect of the invention, a thermal sensor is provided for measuring a temperature of the heater head of a thermal cycle engine at a point of maximum temperature of the heater head. The thermal sensor may be a thermocouple, and a fuel regulator may regulate the fuel supply on the basis of at least the temperature of the heater head at the point of maximum temperature.

In accordance with another embodiment of the invention, a thermal cycle engine may have a secondary ring burner supplementary to the main combustor for supplying additional fuel to cause additional combustion of the exhaust gas.

In accordance with yet another embodiment of the invention, a regenerator for a thermal cycle engine is provided having a random network of fibers formed to fill a specified volume and a material for cross-linking the fibers at points of close contact between fibers of the network. The fibers may be metal, including steel wool, and the material for cross-linking the fibers may be nickel. The fibers may be silica glass and the material for cross-linking the fibers may be tetraethylorthosilicate.

A regenerator for a thermal cycle engine, in accordance with alternate embodiments of the invention, may have a volume defined by an inner sleeve and an outer sleeve, the inner and outer sleeves being substantially concentric, and two parallel planes, each substantially perpendicular to each of the inner and outer sleeves. A random network of fibers is contained within the volume and two parallel screens coupled to both the inner and outer sleeves contain the random network of fibers within the volume.

In accordance with other embodiments of the invention, a method for manufacturing a regenerator for a thermal cycle engine is provided. The method has the steps of filling a form with a random network of electrically conducting fibers, immersing the form in an electroplating solution, and applying a current between the solution and the random network of fibers in such a manner as to deposit a material for cross-linking the electrically conducting fibers at points of close contact between fibers. Alternatively, the form may be filled with a random network of fibers and the random network of fibers may be sintered in such a manner as to cross-link the fibers at points of close contact between fibers.

Yet another method is provided for manufacturing a regenerator for a thermal cycle engine, having the steps of forming a reticulated foam into a specified shape, depositing a ceramic slurry onto the reticulated foam, heat treating the slurry in such a manner as to burn off the foam, and sintering the ceramic.

A method is provided for controlling a measured temperature of a part of a heater head of a thermal cycle engine having an external combustor, the method comprising regulating a fuel flow to the external combustor. And a method is provided for distributing heat circumferentially around a heater head of a thermal cycle engine, the heater head having an interior surface, the method comprising the step of applying a layer of high-thermal-conductivity metal to at least one of the interior and exterior surfaces of the heater head.

BRIEF DESCRIPTION OF THE DRAWINGS

The invention will be more readily understood by reference to the following description, taken with the accompanying drawings, in which:

FIGS. 1a–1e depict the principle of operation of a prior art Stirling cycle machine;

DETAILED DESCRIPTION OF PREFERRED EMBODIMENTS

The present application contains subject matter related to that of copending U.S. patent application Ser. No. 09/517,808, entitled "Auxiliary Power Unit" and U.S. patent application Ser. No. 09/517,686, now issued as U.S. Pat. No. 6,247,310, entitled "System and Method for Control of Fuel and Air Delivery in a Burner of a Thermal Cycle Engine", both of which application are incorporated herein by reference.

Figure 2:
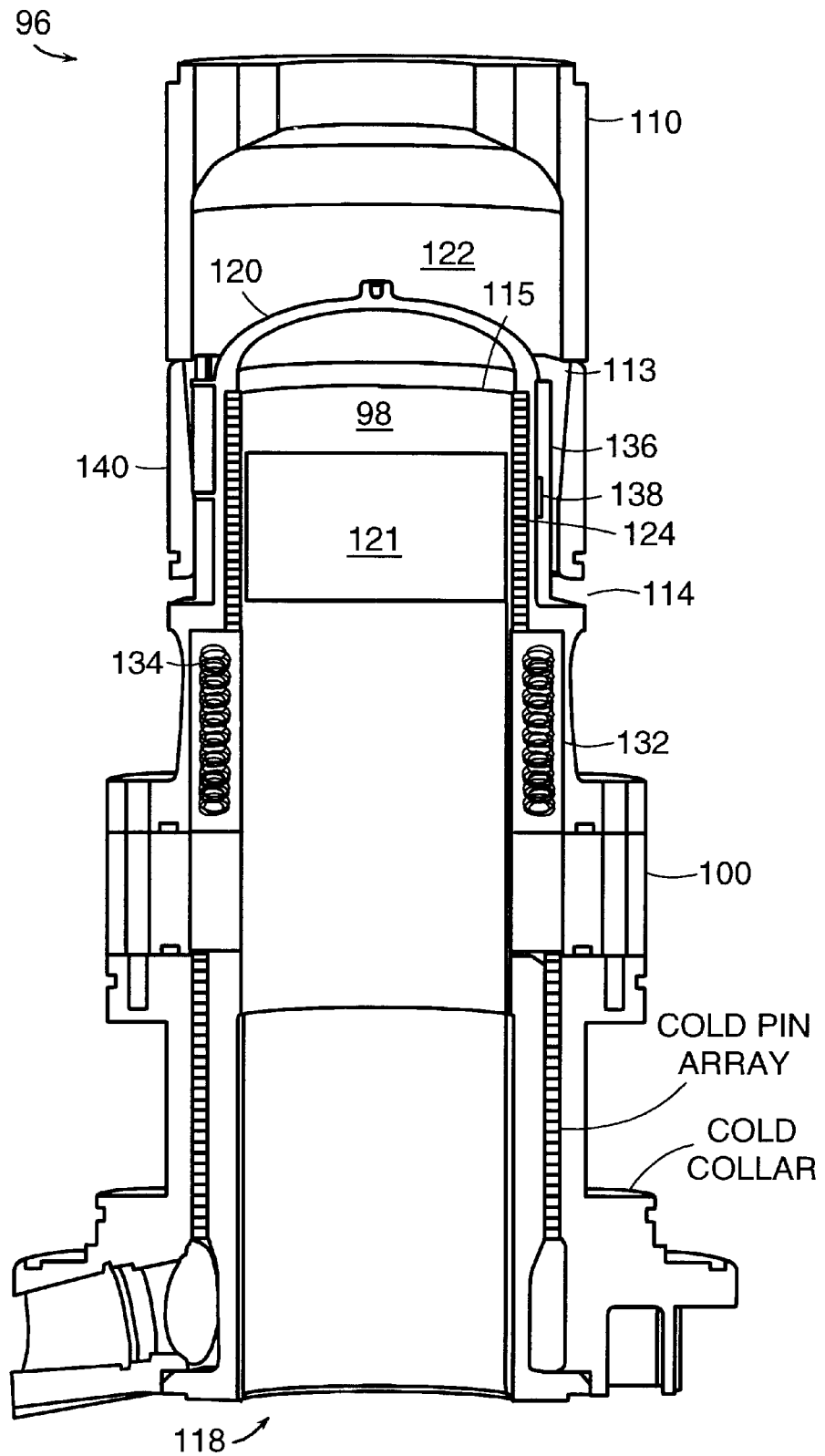
FIG. 2 shows a side view in cross section of the heater head and combustion chamber of a thermal engine in accordance with a preferred embodiment of the present invention.

Referring now to FIG. 2, a cross-sectional view is shown of the expansion volume 98 of a thermal cycle engine, shown for illustrative purposes as a Stirling cycle engine designated generally by numeral 96, and of the corresponding thermal control structures. Heater head 100 is substantially a cylinder having one closed end 120 (otherwise referred to as the cylinder head) and an open end 118. Closed end 120 is disposed in a combustion chamber 122 defined by an inner combustor structure 110. Hot combustion gases in combustion chamber 122 are in direct thermal contact with heater head 100 and thermal energy is transferred by conduction from the combustion gases to the heater head and from the heater head to the working fluid of the thermal engine, typically helium. Other gases such as nitrogen, for example, may be used within the scope of the present invention, with a preferable working fluid having high thermal conductivity and low viscosity. Non-combustible gases are also preferred. Heat is transferred from the combustion gases to the heater head as the combustion gases flow along the outside surface of closed end 120 within a gas flow channel 113.

Expansion volume 98 is surrounded on its sides by expansion cylinder liner 115, disposed, in turn, inside heater head 100 and typically supported by the heater head. The expansion piston 121 travels along the interior of expansion cylinder liner 115. As the expansion piston travels toward closed end 120 of heater head 100, the working fluid within the heater head is displaced and caused to flow through flow channels defined by the outer surface of the expansion cylinder liner 115 and the inner surface of heater head 100.

The overall efficiency of a thermal engine is dependent in part on the efficiency of heat transfer between the combustion gases and the working fluid of the engine. One method known in the art for transferring heat efficiently from the combustion gases in combustion chamber 122 to the working fluid in expansion volume 98 requires a plurality of heating loops (not shown in FIG. 2, as they form no part of the specific embodiment shown there) that extend beyond the heater head and into the combustion chamber. The working fluid is transported along the heating loops and heated by the combustion gases via conduction through the heating loops. In order to increase heat transfer, the heating loops typically have thin walls. Additionally, the heating loops typically have sharp turns in order to fit into the combustion chamber. The combination of thin walls and sharp turns create local regions of high-stress that tend to be the location of breach of the working fluid volume, thereby causing failure of the engine.

Figure 3:
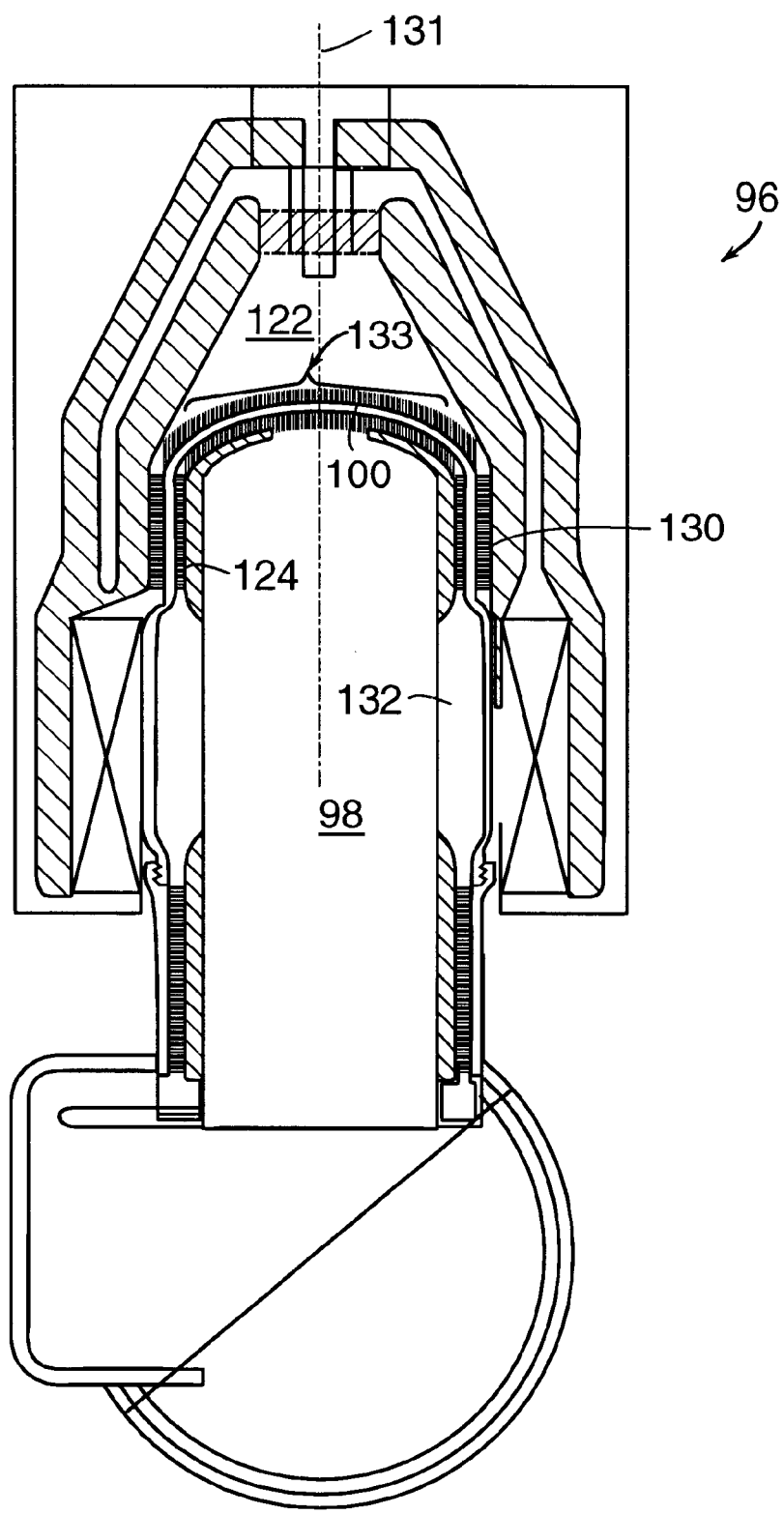
FIG. 3 shows a further cross section of the heater head and combustion chamber of FIG. 2 along a direction in which both interior-facing and exterior-facing thermal pins are evident, and includes heat transfer pins lining the interior and exterior surfaces of the top of heater head, in accordance with an alternate embodiment of the invention.

Alternatively, fins or pins may be used to increase the interfacial area between the hot fluid combustion products and the solid heater head so as to transfer heat, in turn, to the working fluid of the engine. Heater head 100 may have heat transfer pins 124, here shown on the interior surface of heater head 100, in the space between the heater head and expansion cylinder liner 115. Additionally, as shown in FIG. 3 in a cross section of Stirling cycle engine 96 taken along a different diameter of expansion volume 98 from that of FIG. 2, heat transfer pins 130 may also be disposed on the exterior surface of heater head 100 so as to provide a large surface area for the transfer of heat by conduction to heater head 100, and thence to the working fluid, from combustion gases flowing from combustor 122 past the heat transfer pins. Dashed line 131 represents the longitudinal axis of the expansion cylinder. FIG. 3 also shows heat transfer pins 133 lining the interior and exterior surfaces of the top of heater head 100, in accordance with an alternate embodiment of the invention. Interior-facing heat transfer pins 124 serve to provide a large surface area for the transfer of heat by conduction from heater head 100 to working fluid displaced from expansion volume 98 by the expansion piston and driven through regenerator chamber 132.

The use of heat transfer pins for the transfer of heat across a manifold separating fluids is described in copending U.S. patent application Ser. No. 09/115,381. Depending on the size of heater head 100, hundreds or thousands of inner transfer pins 124 and outer heat transfer pins 130 may be desirable.

One method for manufacturing heater head 100 with heat transfer pins 124 and 130 includes casting the heater head and pins as an integral unit. While typically more cheaply accomplished than machining or assembly of the pin arrays, casting pin arrays may still have attendant difficulties and substantial costs. Additionally, the casting process may result in a heater head that is less than fully densely populated with pins, thus increasing the fraction of gases failing to collide with heater head surface and reducing the efficiency of heat transfer.

Figure 4:
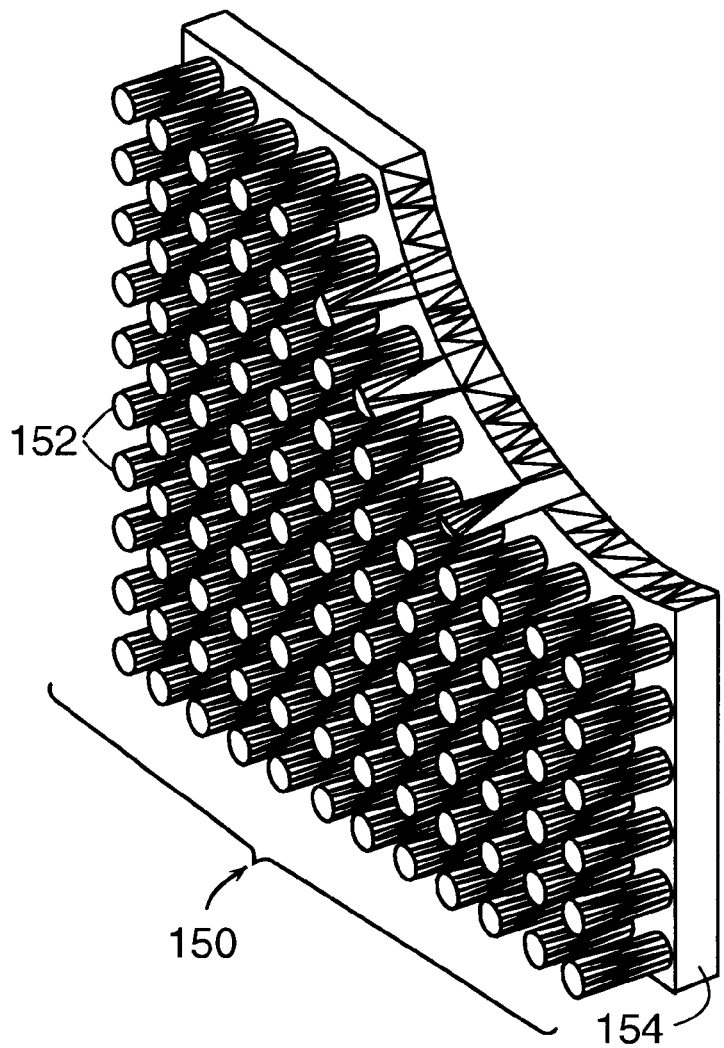
FIG. 4 is a perspective view of a heat transfer pin array separately cast for assembly to a heater head in accordance with an embodiment of the present invention.

A method for populating the surfaces of heater head 100 with heat transfer pins, in accordance with an embodiment of the invention, entails fabrication of heater 100 and arrays of heat transfer pins in separate casting processes. An array 150 of heat transfer pins 152 cast with panel 154 is shown in FIG. 4. Pin arrays 150, after casting, are mounted to the inner and outer surfaces of the heater head by a high temperature braze. Thus, a more densely populated head with a resultant low rate of gas leakage past the pins may advantageously be achieved. In other embodiments, panels 154 may be secured by various mechanical means to the heater head. Slots may be provided in dividers 506 (described in the next paragraph) for holding the panels in place against the head. Alternatively, panels 154 may be sintered to the heater head.

Figure 5A:
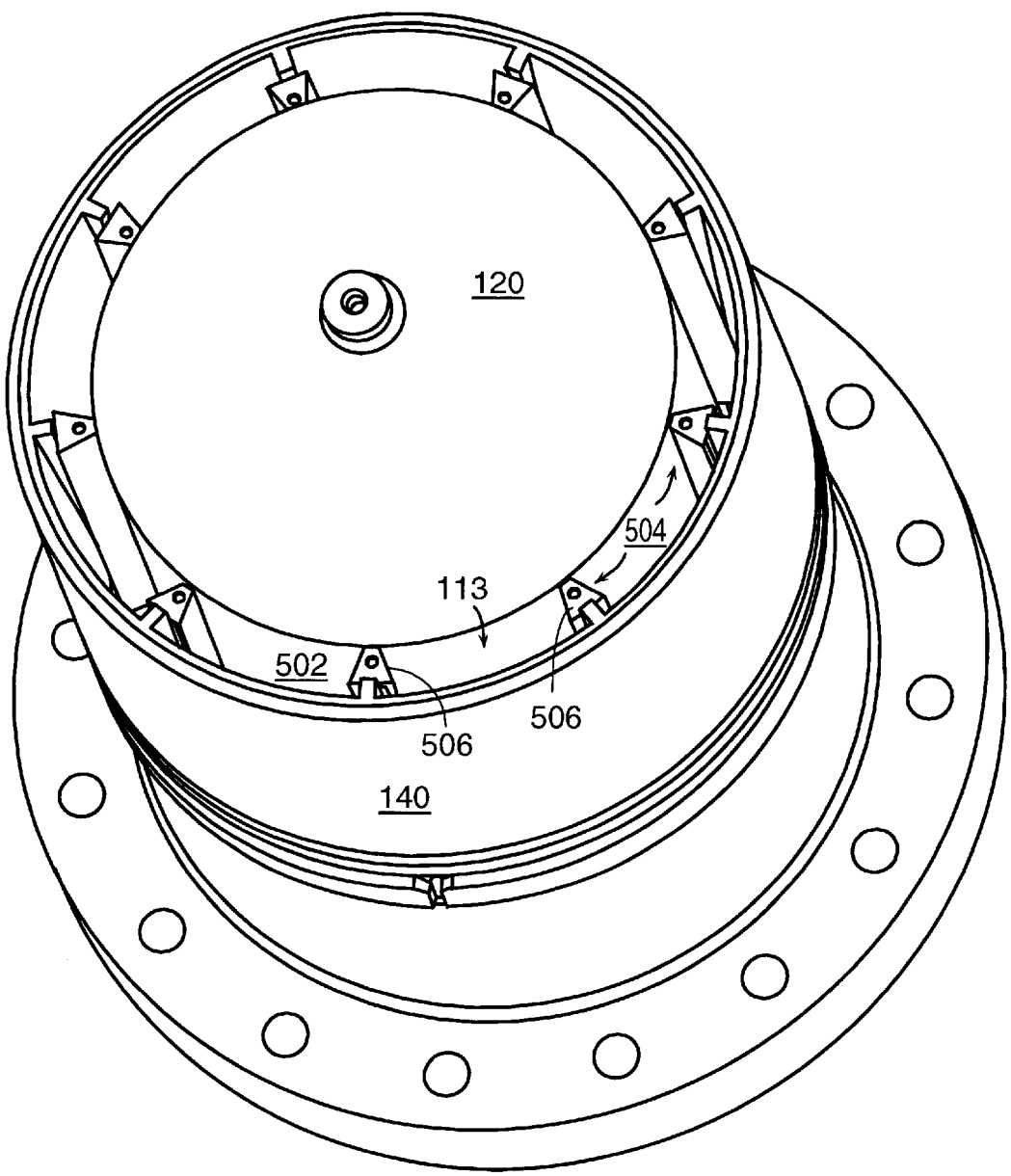
FIG. 5a shows a perspective top view of a heater head for mounting cast segments of heat transfer pin arrays such as shown in FIG. 4.

In accordance with certain embodiments of the invention, individual arrays 150, each with its associated panel segment 154, comprise arcuate fractions of the circumferential distance around the heater head. This is apparent in the top view of the heater head assembly shown in perspective in FIG. 5*a*. Cylinder head 120 is shown, as is exterior surface 502 of the heater head. Backer segments supporting arrays of heat transfer pins are not shown but are inserted, during assembly, in spaces 504 surrounding exterior surface 502 of the heater head. Between successive heat transfer pin array segments are trapezoidal dividers 506 which are baffled to block the flow of exhaust gases in a downward direction through any path other than past the heat transfer pins. Hot gas flow path 113 (shown also in FIG. 2), is defined, on the outside, by gas flow channel cover 140. Since exhaust gases do not flow through dividers 506, a temperature sensor, such as thermocouple 138 (shown in FIGS. 2 and 5*c*) is advantageously disposed in divider 506 in order to monitor the temperature of heater head 100 with which the temperature sensor is in thermal contact. The position of pin arrays 150 and temperature sensor 138 mounted within divider 506 is shown more clearly in the view of FIG. 5*b* in which the pin backer has been removed.

Figure 5B:
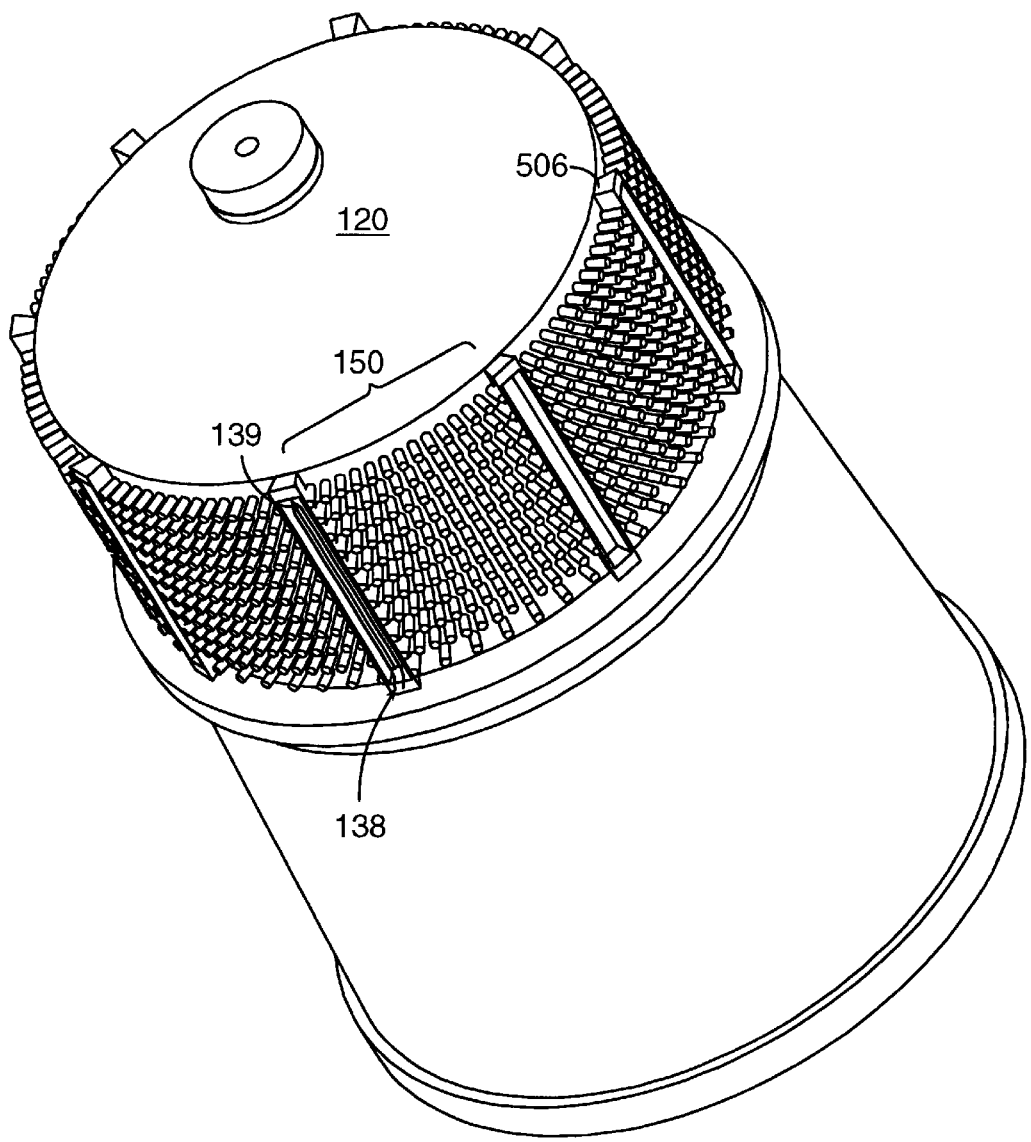
FIG. 5b shows a perspective top view of a heater head with mounted cast segments of heat transfer pin arrays, with the pin backer removed to show the heat transfer pins.
Figure 5C:
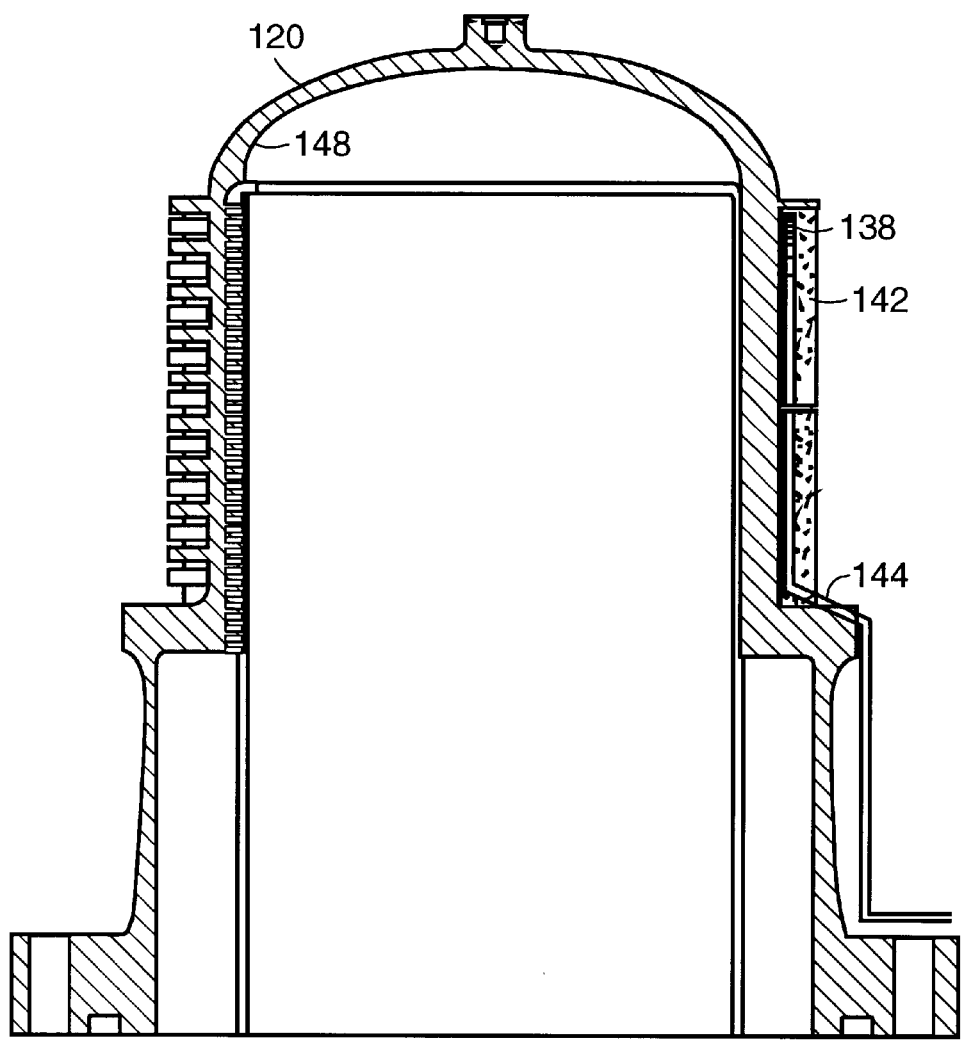
FIG. 5c is a cross sectional side view of the heater head assembly of FIG. 3 showing the placement of ceramic insulation between the heater head temperature sensors and the exhaust gas, in accordance with an embodiment of the invention.

Temperature sensing device 138 is preferably disposed within divider 506 as depicted in FIG. 5*b*. More particularly, temperature sensing tip 139 of temperature sensor 138 is. preferably located in the slot corresponding to divider 506 as nearly as possible to cylinder head 120 in that this area is typically the hottest part of the heater head. Alternatively, temperature sensor 138 might be mounted directly to cylinder head 120, however location of the sensor in the slot, as described, is preferred. Engine performance, in terms of both power and efficiency, is highest at the highest possible temperature, yet the maximum temperature is typically limited by metallurgical properties. Therefore, sensor 138 should be placed to measure the temperature of the hottest, and therefore the limiting, part of the heater head. Additionally, temperature sensor 138 should be insulated from combustion gases and walls of divider 506 by ceramic insulation 142, as shown in FIG. 5*c*. The ceramic can also form an adhesive bond with the walls of the divider to retain the temperature sensor in place. Electrical leads 144 of temperature sensor 138 should also be electrically insulated.

Although the burner is designed to have circumferential symmetry, hot spots may develop on heater head 120. Adding to the problem, the alloys typically employed for fabrication of the heater head, on account of their high melting point, have relatively poor thermal conductivity. Once hot spots form, they are apt to endure because the gas flow outside the head is axial rather than circumferential, since dividers 506 (shown in FIG. 5*a*) impede any circumferential flow. Additionally, heating may increase local gas viscosity thereby redirecting more flow to other channels. In order to even out the temperature distribution on the heater head, a layer of highly thermally conductive metal, such as copper, of thickness greater than 0.001 in. and preferably about 0.005 in. is applied to interior surface 148 of heater head 120, by deposition or plating, or other application method. Alternatively, a similar coating may be applied to the exterior surface, in accordance with another embodiment of the invention.

In order to keep the size of the Stirling cycle engine small, it is important to maximize the heat flux from the combustion gas through the heater head. Whereas prior art employed loops of pipe in which heat transfer to the working fluid is achieved, loops engender both low reliability (since the loops are mechanically vulnerable) and higher cost, due to the more complicated loop geometry and extra materials. The limiting constraint on the heat flux in accordance with embodiments of the present invention are the thermo-mechanical properties of the heater head material that must be able to withstand the high temperatures of the combustion chamber while maintaining the structural integrity of the pressurized head. The maximum design temperature is determined by the hottest point on the heater head which is typically at the top of the wall. Ideally, the entire heater wall hot section would be at this maximum temperature, as may be controlled, for example, by controlling the fuel flow.

As combustion gases travel past the heater head in gas flow channels 113 (shown in FIG. 2), the gas temperature decreases as heat is transferred from the gas to the heater head. As a result, the maximum allowed heater head temperature at the top of the gas flow channel must be set by the material used for the heater head. The material is preferably chosen from the family of high nickel alloys, commonly known as super alloys, such as Inconel 600 (having a maximum temperature $T_{max}$=800° C. before softening), Inconel 625 ($T_{max}$=900° C.), Inconel 754 ($T_{max}$=1080° C.), or Hastelloy GMR 235 ($T_{max}$=935° C.). The gas in gas channel 113 may cool by as much as 350° C. on transit through the channel, resulting in underheating of the bottom of the hot zone.

In accordance with preferred embodiments of the present invention, the temperature profile of the heater wall is controlled by means of heat transfer geometry, as now described. One method for controlling the geometry is by means of providing a variable cross-section gas flow channel 113 (shown in FIGS. 2 and 6*a*). The radial dimension (perpendicular to the wall of the heater head), and thus the cross-section of the channel, is large at the top of the heater wall, thereby allowing much of the gas to bypass the pin array at the top of the wall. The bypass allows hotter gas to reach the pin array at the bottom of the wall thereby allowing the bottom pin array to operate closer to its maximum temperature. The temperature gradient from the top of the heater to the bottom of the hot section (before regenerator volume 132, shown in FIG. 2) has been reduced from as much as 350° C. to 100° C. using a variable cross-section gas flow channel.

A second method for controlling the geometry is by varying the population density and the geometry of the pin array as a function of position along the gas flow channel. The geometry of the pins may be adjusted by varying the height/diameter (H/D) ratio of the pins. If a casting process is used to form the pin array, the range of H/D rations may be limited by the process. If pin rings are used, the range of H/D ratios may be extended.

Figure 6A:
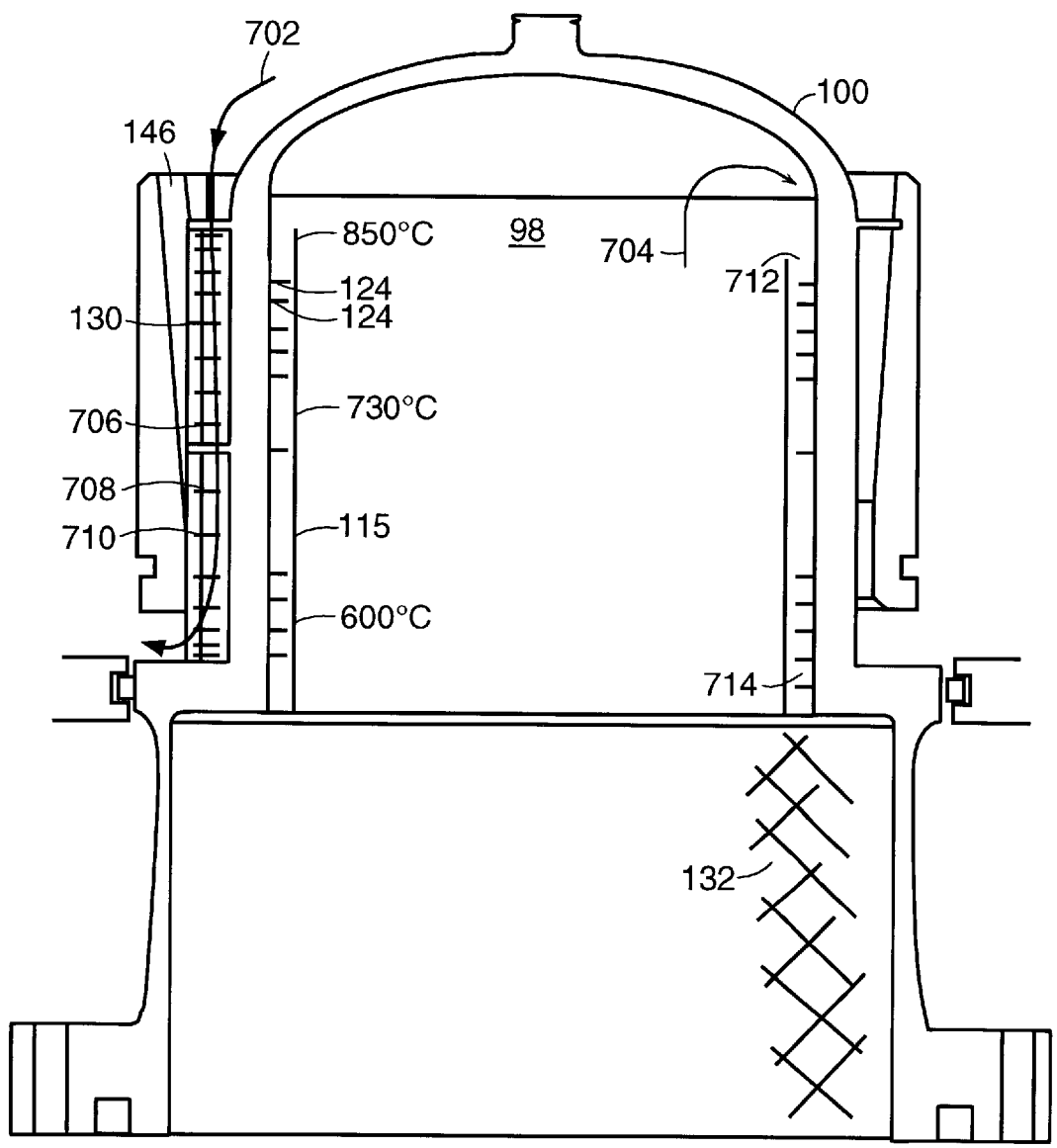
FIG. 6a is a cross sectional side view of the heater head assembly of FIG. 3 (with several heat transfer pins shown schematically for clarity) showing a typical gradient of temperatures as working fluid is driven into the regenerator of a Stirling cycle engine in accordance with an embodiment of the present invention.
Figure 6B:
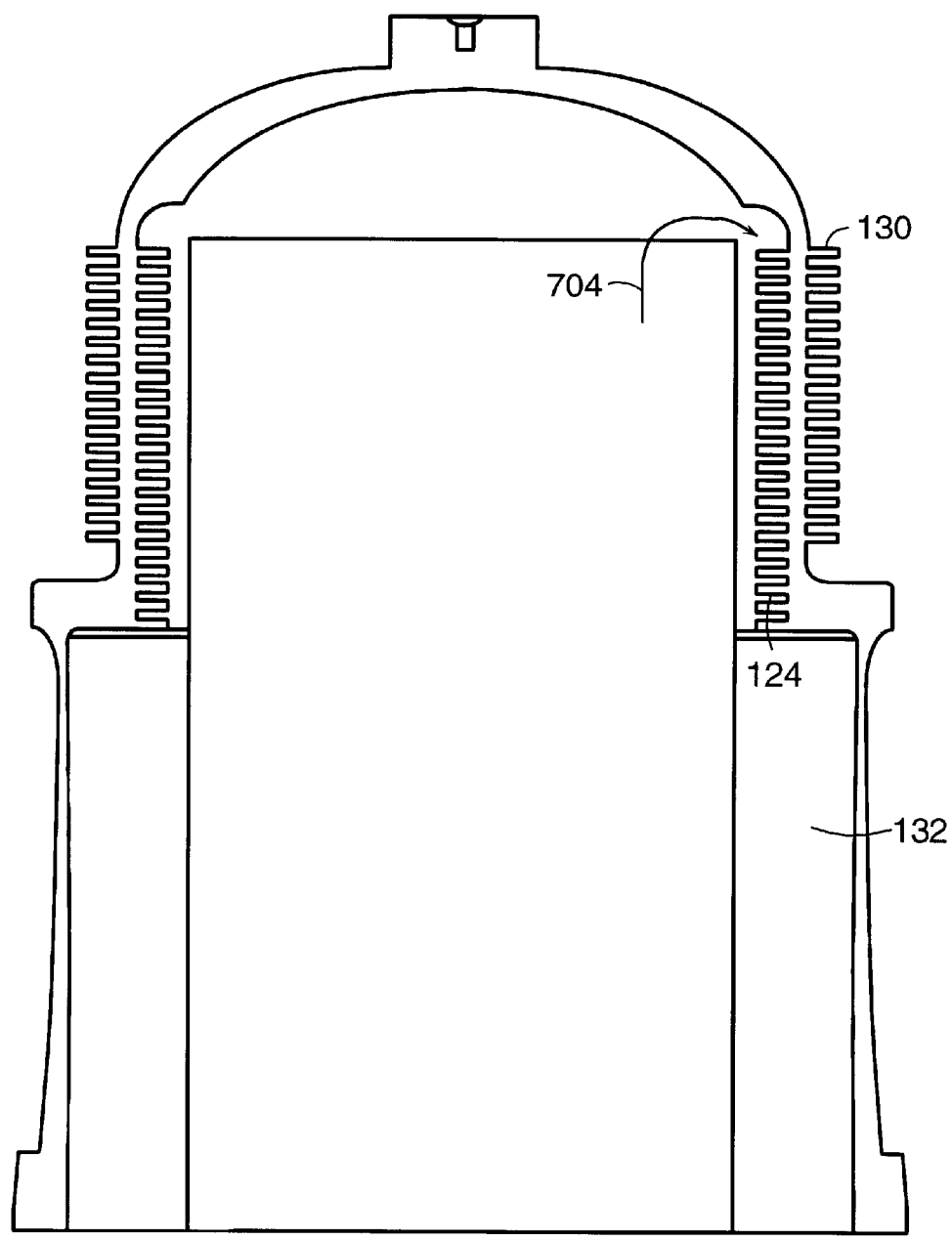
FIG. 6b shows the same cross sectional side view as FIG. 6a, with additional heat transfer pins shown, not to scale, and with the gas flow channel cover removed for clarity.

Referring now to FIG. 6*a*, arrow 702 designates the path of heated exhaust gases past heater head 100. Outer heat transfer pins 130 intercept the heated exhaust gases and transfer heat via heater head 100 and inner heat transfer pins 124 to the working fluid that is driven from expansion cylinder 115 along path 704. (For clarity, heat transfer pins 130 and 124 are shown schematically in FIG. 6*a*. Additional heat transfer pins 130 and 124 had been depicted, not to scale, in the view of FIG. 6*b*.) Successive heat transfer pins 706, 708, and 710, for example, present a progressively larger cross section to the flow of exhaust gas along path 702. Thus, while the exhaust gas has transferred some fraction of its heat prior to arrival at the lower pins, heat is extracted there with a greater conduction rate, thereby reducing the temperature gradient between the top 712 and bottom 714 of the path of working fluid between expansion volume 98 and regenerator volume 132. Typical temperatures of the surface of expansion cylinder 115 are indicated in FIG. 6*a*: 850° C. at the top of the cylinder, 750° C. at the center of the cylinder, and 600° C. at the end of the cylinder closest to the regenerator volume.

Another method for achieving more even distribution of heat from the exhaust gases to the heater head, in accordance with a further embodiment of the invention, is to create a tapered divider on the outside diameter of the heater head by means of concentric tapered pin backer 146, as shown in FIG. 6*a*. The cross-sectional view of FIG. 6*a* shows how tapered pin backer 146 allows some of the hottest exhaust gas to bypass the pins near the top of the heater head. Pin backer 146 creates a narrowing annular gap on the outside of the pins that progressively forces more and more of the exhaust gases into the pin heat exchanger.

Figure 7A:
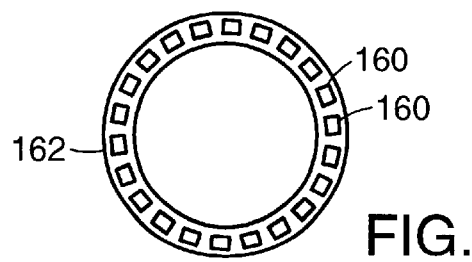
FIGS. 7a–7d depict the application of heat transfer pin rings to provide for thermal transfer between fluids and a heater head in accordance with an embodiment of the present invention.
Figure 7B:
Figure 7C:
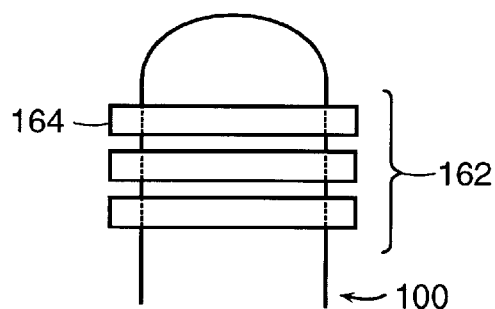
Figure 7D:
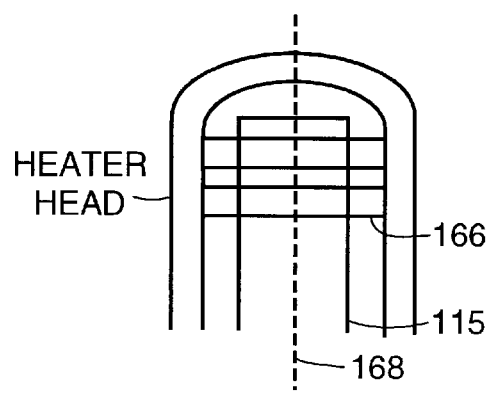

Another method for increasing the surface area of the interface between a solid such as heater head 100 and a fluid such as combustion gases as discussed above is now described with reference to FIGS. 7*a*–7*d*. An effect analogous to that of fabricating heat transfer pins by casting or otherwise may be obtained by punching holes 160 into a thin annular ring 162 shown in top view in FIG. 7*a* and in side view in FIG. 7*b*. The thickness of ring 162, which may be referred to as a 'heat transfer pin ring' is comparable to the thickness of the heat transfer pins discussed above, and is governed by the strength of the heat-conductive material at the high temperature of the combustion gases traversing holes 160. The shape and disposition of holes 160 within each ring is a matter of design for a particular application, indeed, it is within the scope of the present invention and of any appended claims that holes 160 not be surrounded by solid material. The material of rings 162 is preferably an oxidation-resistant metal such as Inconel 625 or Hastelloy GMR 235, though other heat-conducting materials may be used. Rings 162 may be produced inexpensively by a metal stamping process. Rings 162 are then mounted and brazed, or otherwise bonded, to the outer surface heater head 100, as shown with respect to outer pin rings 164 in FIG. 7*c*, and with respect to inner pin rings 166 in FIG. 7*d*. Additional rings may be interspersed between the pin rings to control the vertical spacing between the pins. Expansion cylinder liner 115 is shown in the interior of inner pin rings 166.

The total cross sectional area of the heat transfer pins taken in a slice perpendicular to cylinder axis 168 need not be constant, indeed, it is advantageously varied, as discussed in detail above, in reference to FIG. 6.

Figure 13A:
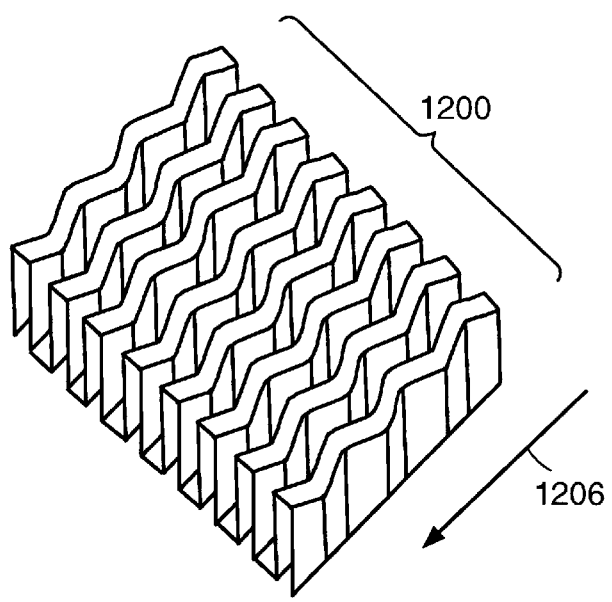
FIGS. 13a–13c show alternate configurations of folded fins for transferring heat between the heater head and either exhaust or working fluids.
Figure 13B:
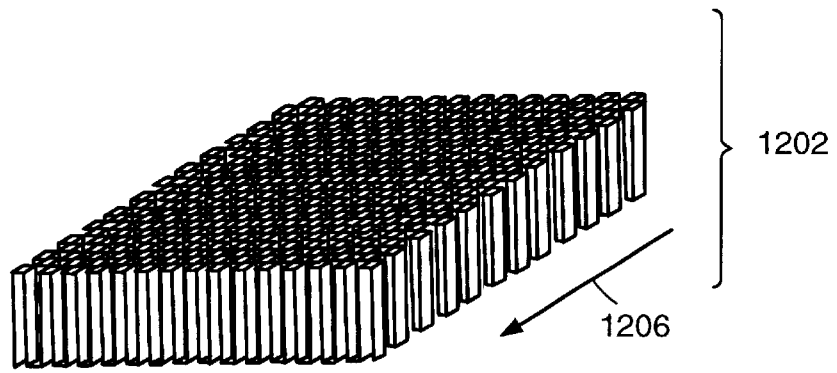
Figure 13C:
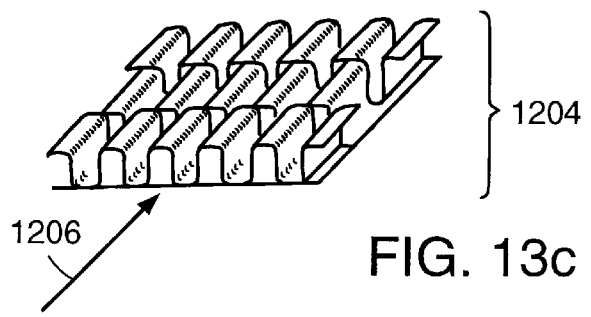

Referring to FIGS. 13*a*–13*c*, the interior or exterior heat exchange surfaces may also be formed from various folded fin structures 1200, 1202, or 1204. The folded fin structures may be made of material similar to that of the heater head pressure dome or of high thermal conductivity materials such as copper which may provide improved fin efficiency. Fins fabricated from high melting-point materials such as that of the heater head 100 (shown in FIG. 2) may be continuous from the top to the bottom of the heater head. Folded fins may be fabricated from sheet metal and brazed to the interior surface of the heater head. Three folded fin configurations are shown by way of example: wavy fins 1200, lanced fins 1202, and offset fins 1204. In each case, the gas flow direction is indicated by an arrow designated by numeral 1206.

Fins formed from a dissimilar metal to that of heater head 100 are attached, in accordance with alternate embodiments of the invention, in axial segments to avoid differential thermal expansion from breaking the brazed joint between the fins and the head. The offset fin configuration of FIG. 13*c* advantageously provides a superior heat transfer coefficient to that of plain fins.

The use of high thermal conductivity metal for the folded fins may advantageously allow the fins to be made longer, thereby improving heat transfer and reducing resistance to flow of the gas and improving engine efficiency.

Referring again to FIG. 2, as the working fluid is displaced from expansion cylinder 115 by the expansion piston, working fluid is further heated in passage over the inner pin array 124 and driven through regenerator chamber 132. A regenerator 134 is used in a Stirling cycle machine, as discussed above, to add and remove heat from the working fluid during different phases of the Stirling cycle. The regenerator used in a Stirling cycle machine must be capable of high heat transfer rates which typically suggests a high heat transfer area and low flow resistance to the working fluid. Low flow resistance also contributes to the overall efficiency of the engine by reducing the energy required to pump the working fluid. Additionally, regenerator 134 must be fabricated in such a manner as to resist spalling or fragmentation because fragments may be entrained in the working fluid and transported to the compression or expansion cylinders and result in damage to the piston seals.

One regenerator design uses several hundred stacked metal screens. While exhibiting a high heat transfer surface, low flow resistance and low spalling, metal screens may suffer the disadvantage that their cutting and handling may generate small metal fragments that must be removed before assembling the regenerator.

Figure 8A:
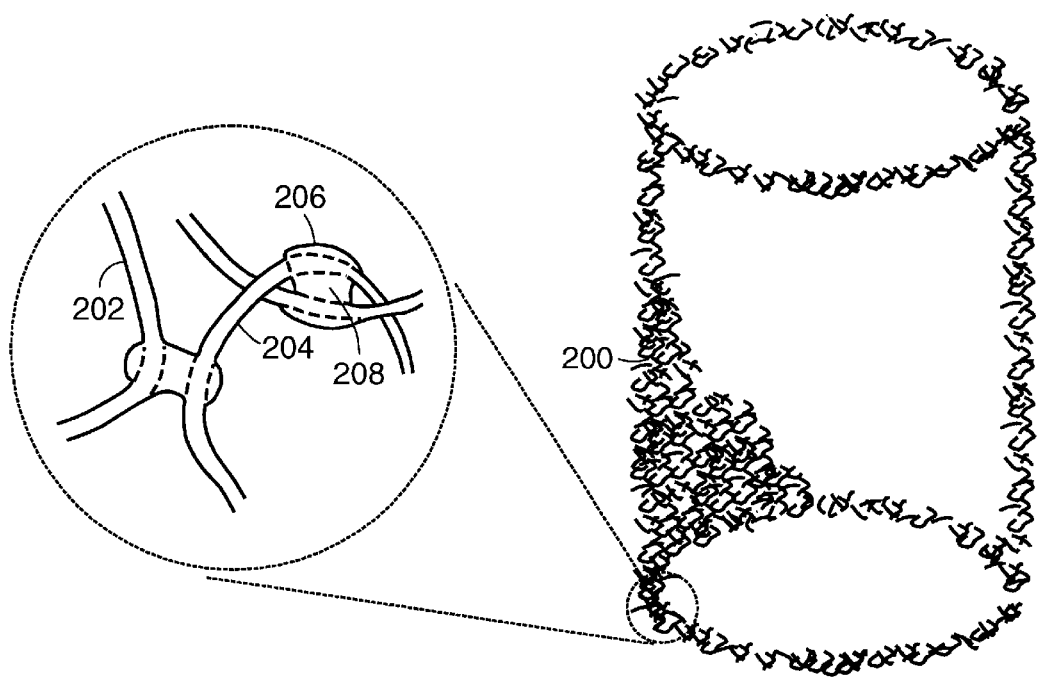
FIG. 8a depicts the fabrication of a regenerator by electroplating of a fibrilose starting material in accordance with an embodiment of the present invention.

In accordance with an embodiment of the invention, a three dimensional random fiber network, such as stainless steel wool or ceramic fiber, for example, may be used as the regenerator, as now described with reference to FIG. 8*a*. Stainless steel wool regenerator 200 advantageously provides a large surface area to volume ratio, thereby providing favorable heat transfer rates at low fluid flow friction in a compact form. Additionally, cumbersome manufacturing steps of cutting, cleaning and assembling large numbers of screens are advantageously eliminated. The low mechanical strength of steel wool and the tendency of steel wool to spall may both be overcome as now described. In accordance with an embodiment of the invention, the individual steel wires 202, 204 are "cross-linked" into a unitary 3D wire matrix.

Figure 8B:
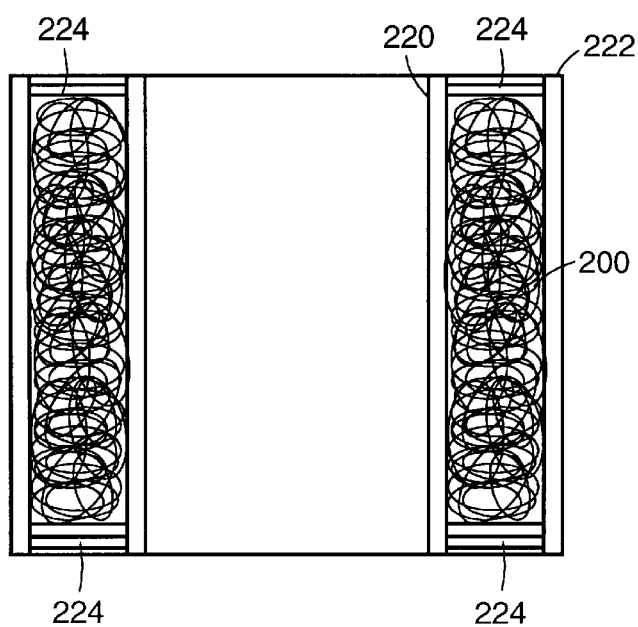
FIG. 8b is a cross-sectional of the regenerator chamber of a Stirling cycle engine in accordance with the present invention.

The starting material for the regenerator may be fibrilose and of random fiber form such as steel wool. The composition of the fiber may be a glass or a ceramic or a metal such as steel, copper, or other high temperature materials. The diameter of the fiber is preferably in the range from 10 micrometers to 1 millimeter depending on the size of the regenerator and the properties of the metal. The starting material is placed into a form corresponding to the final shape of the regenerator which is depicted in cross-section in FIG. 8*b*. Inner canister cylindrical wall 220, outer canister cylindrical wall 222, and regenerator network 200 are shown. The density of the regenerator is controlled by the amount of starting material placed in the form. The form may be porous to allow fluids to pass through the form.

In an alternate embodiment of the invention, unsintered steel wool is employed as regenerator network 200. Regenerator network 200 is then retained within the regenerator canister by regenerator retaining screens 224 which may advantageously capture steel wool fragments.

In one embodiment of the invention, applicable to starting material that is electrically conducting, the starting material is placed in a porous form and placed in an electrolyte bath. The starting material may be a metal, such as stainless steel, for example. An electrical connection is made with the starting material thereby forming an electrode. Cross-linking of the individual fibers in the starting material is accomplished by electrically depositing a second material 206 onto the starting material. The selection of the starting material will depend on such factors as the particular deposition technique chosen and the chemical compatibility of the first and second materials, as known to one of ordinary skill in the electro-chemical art. During deposition, the second material will build up on the starting material and form bridges 208 between the individual fibers of the starting material in places where the individual fibers are in close proximity to each other. The deposition is continued until the bridges have grown to a sufficient size to hold the two individual fibers rigidly in place.

The deposition duration depends on the particular deposition process and is easily determined by one of ordinary skill in the art. After the deposition is completed, the regenerator is removed from the bath and the form and is cleaned.

In another embodiment of the invention, the starting material is placed in a form which may or may not be porous. The form containing the starting material is placed in a furnace and is partially sintered into a unitary piece. The selection of the sintering temperature and sintering time is easily determined by one of ordinary skill in the sintering art.

In another embodiment of the invention, the starting material is placed in a porous form. The form containing the starting material is placed in a chemical bath and a second material, such as nickel, is chemically deposited to form bridges between the individual fibers.

In another embodiment of the invention, the starting material is a silica glass fiber which is placed into a porous form. The glass fiber and form is dipped in a solution of tetraethylorthosilicate (TEOS) and ethanol so that the fiber is completely wetted by the solution. The fiber and form are removed from the solution and allowed to drain in a humid atmosphere. The solution will form meniscoidal shapes bridging fibers in close proximity to each other. The humidity of the atmosphere will start the hydrolysis-condensation reaction that converts the TEOS to silica forming a cross link between the two fibers. The fiber and form may be heat treated at a temperature less than 1000° C., most preferably less than 600° C., to remove the reactant products and form a silica bridge between the fibers.

In another embodiment of the invention, a ceramic slurry is deposited onto a reticulated foam having the shape of the regenerator. The slurry is dried on the reticulated foam and heat treated to burn off the foam and sinter the ceramic. The ceramic may be composed of an oxide ceramic such as cordierite, alumina, or zirconia. The composition of the ceramic slurry and the heat treatment profile is easily specified by one of ordinary skill in the ceramic processing art.

Figure 9:
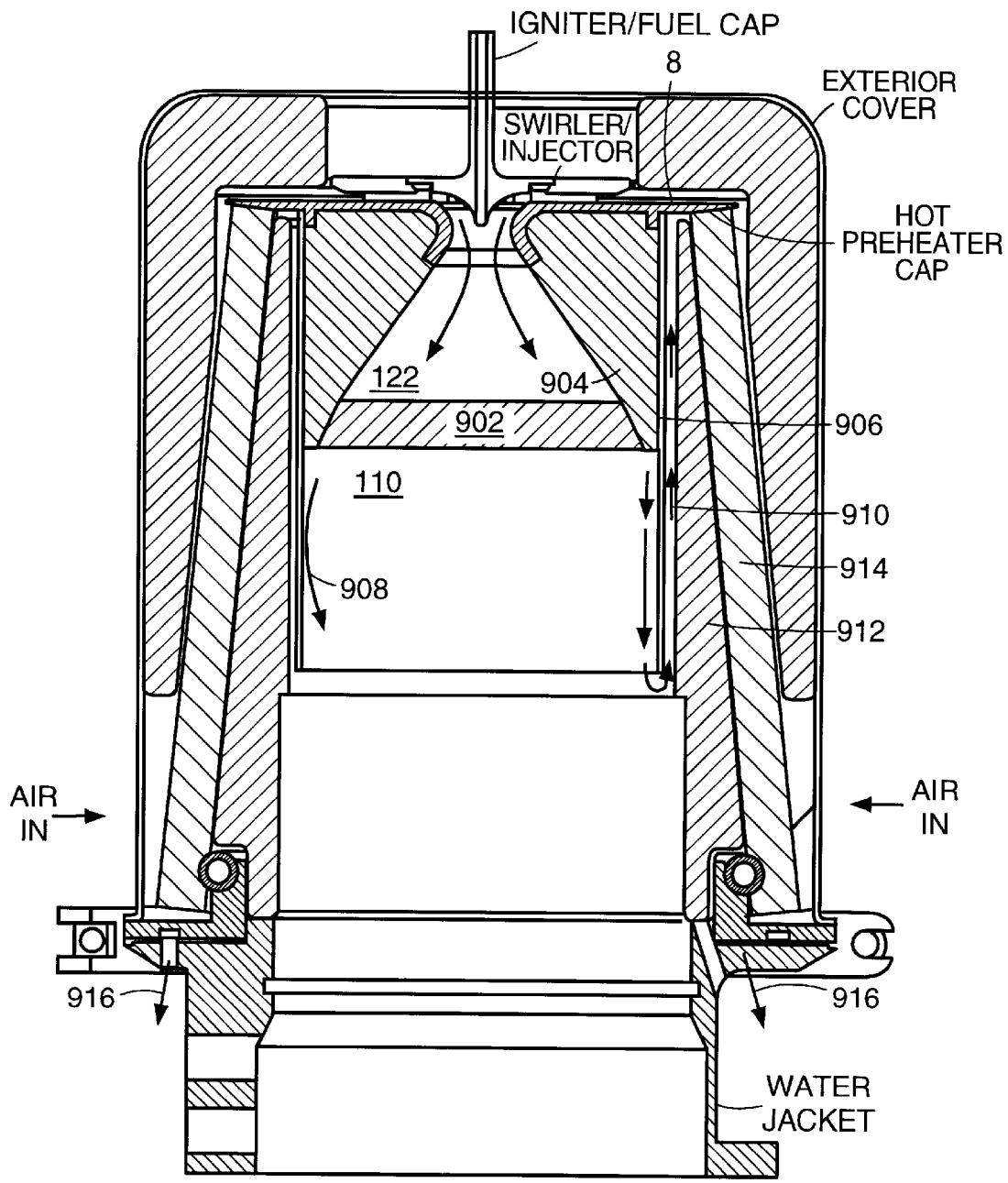
FIG. 9 is a side view in cross section of the burner and heat recovery assembly, in accordance with an embodiment of the present invention.

In the embodiment of the invention depicted in FIG. 2, the exhaust combustion gases exit gas flow channel 113 through a port 114 leading to a pre-combustion air preheater inlet, discussed now with reference to FIG. 9 which shows a side view, in cross section, of the preheater and heater head assemblies.

While Stirling engines are capable of providing high thermal efficiency and low emission of pollutants, these objectives impose requirements of thermal efficiency, in particular, on a burner employed to heat heater head 110 of the Stirling engine. Components of such thermal efficiency include the efficient pumping of oxidant (typically, air, and, referred to herein and in any appended claims, without limitation, as "air") through burner 122 to provide combustion, and the recovery of the thermal energy contained in the exhaust leaving the heater head. In many applications, air (or other oxidant) is pre-heated, prior to combustion, nearly to the temperature of the heater head, so as to achieve the stated objectives of thermal efficiency.

In order to achieve low emissions, the fuel and air must be well-mixed with sufficient amounts of oxygen to limit the emission of carbon monoxide (CO) and, additionally, must be burned at low enough flame temperatures to limit the formation of oxides of nitrogen ($NO_x$). The high temperature of preheated air, desirable for achieving high thermal efficiency, complicates achieving low-emission goals by making it difficult to premix the fuel and air and requiring large amounts of excess air in order to limit the flame temperature.

As used herein and in any appended claims, the term "auto-ignition temperature" is defined as the temperature at which a fuel will ignite without a temperature-decreasing catalyst under existing conditions of air and fuel pressure. The typical preheated air temperature exceeds the auto-ignition temperature of most fuels, potentially causing the fuel-air mixture to ignite before entering the combustion chamber. One solution to this problem is to use a non-premixed diffusion flame. However, since such diffusion flames are not well-mixed, higher than desirable emissions of CO and $NO_x$ result. A detailed discussion of flame dynamics is provided by Turns, *An Introduction to Combustion: Concepts and Applications*, (McGraw-Hill, 1996), which is incorporated herein by reference. Any increased air flow provided to limit flame temperatures typically increases the power consumed by an air pump or blower, thereby degrading overall engine efficiency.

Low emissions and high efficiency may be provided by producing a pre-mixed flame even in the presence of air heated above the auto-ignition temperature of the fuel, and, additionally, by minimizing the pressure drop between the air inlet and the flame region, thereby minimizing blower power consumption, as discussed in the co-pending U.S. applications from which this application claims priority.

The term "flame speed" is defined as the speed at which a flame front will propagate through a particular fuel-air mixture. Within the specification and the following claims, the term "combustion axis" shall refer to the direction of predominant fluid flow upon combustion of the fluid.

Typical components of the burner and preheater assemblies, in accordance with embodiments of the present invention, are described with reference to FIG. 9. The target range for combustion gases is 1700–2300 K, with a preferred range of 1900–1950 K. Operating temperatures are limited by the strength of heater head 110 which must contain working fluid at an operating pressure of typically several atmospheres. Since the strength of metals and resistance to oxidation typically decreases at high temperatures, it is important to shield metal components from the high combustion temperatures. To that end, burner 122 is surrounded by a ceramic combustion chamber 904, itself encased in a metal combustion chamber liner 906, thermally sunk to heater head 110 and cooled by incoming air from the preheater path (e.g., 1102, shown in FIG. 12) or by exhaust gases 910. Additionally, heater head 110 is shielded from direct flame heating by heater head flame cap 902. Ceramic combustion chamber 904 is preferably fabricated using a ceramic casting process. The exhaust products of the combustion process follow path 908 past heater head 110 through a channel providing for efficient transfer of heat to the heater head and to the working gas contained within the heater head, using heat transfer pins or other heat transfer means, as has been discussed above.

Exhaust gases are then channeled up along path 910, between chamber liner 906 and inner insulation 912, thereby absorbing additional heat from chamber liner 906, with the additional advantage of preventing overheating of the chamber liner. The exhaust gases are then returned downward through preheater 914 and exhausted around the circumference of heater head 110 as shown by arrows designated 916. Preheater 914 allows for exchange of heat from the exhaust gases to the air taken in from the ambient environment, typically by an air pump or blower. Preheater may be fabricated from corrugated folder fins, typically Inconel. However any means for exchange of heat from the exhaust to the input air is within the scope of the present invention. Using a preheater with 2.5 ft$^2$ area, it is possible to recover more than 80% of the heat carried by the exhaust gases beyond the heater head. Preheaters of other areal extent are within the scope of the present invention as described and claimed.

Figure 10A:
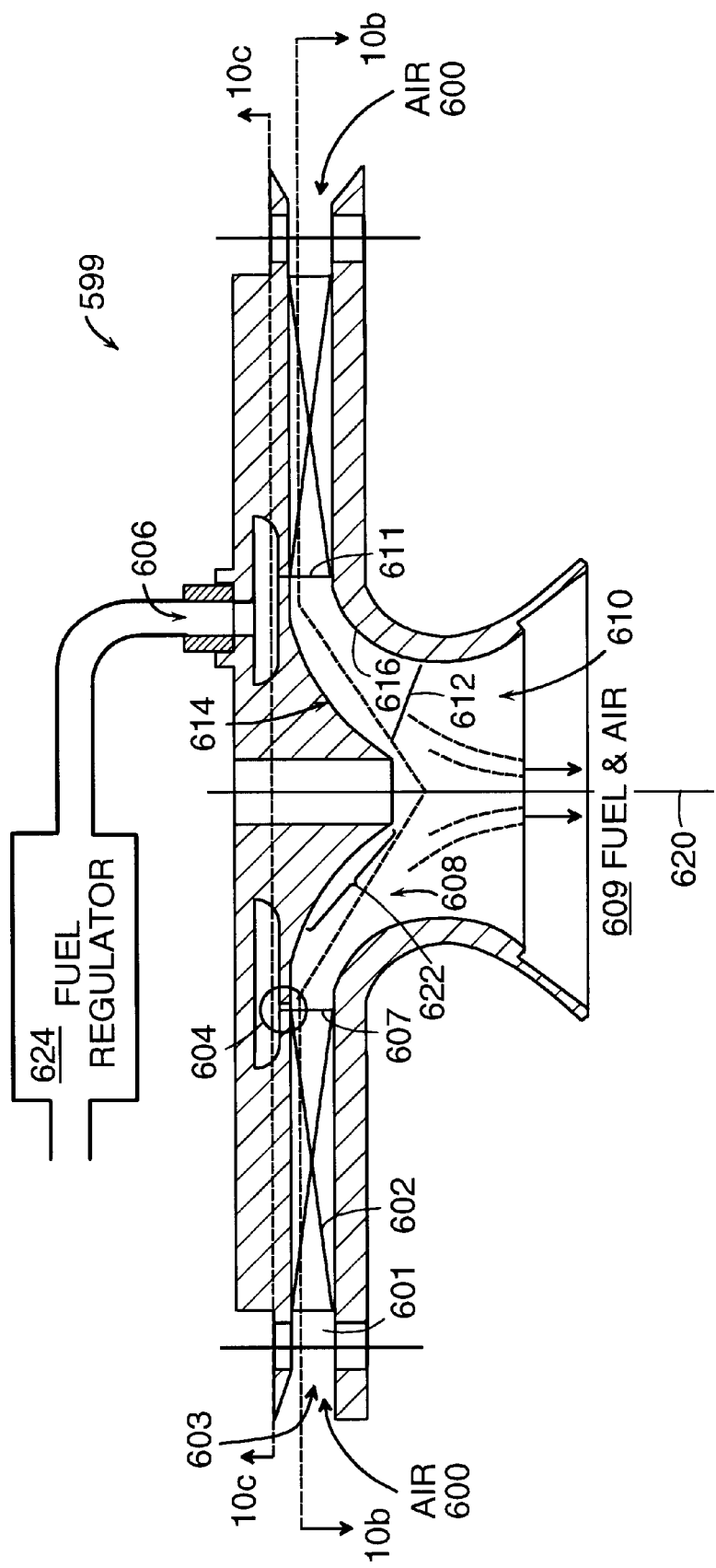
FIG. 10a shows a cross-sectional view from the side of a fuel intake manifold for a Stirling cycle engine in accordance with a preferred embodiment of the invention.
Figure 10B:
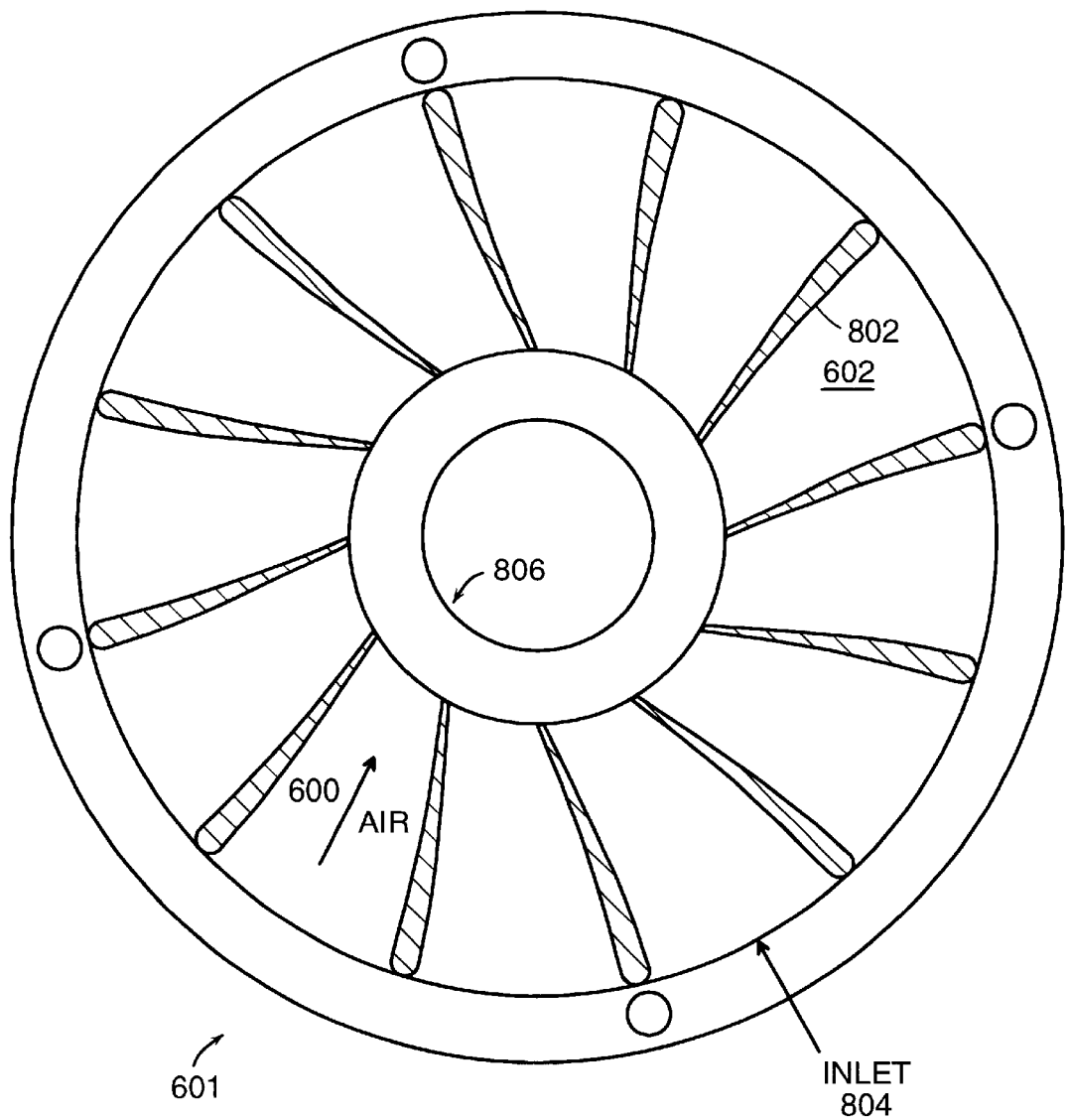
FIG. 10b shows a cross sectional view from the top of the fuel intake manifold of FIG. 10a taken through cut BB.
Figure 10C:
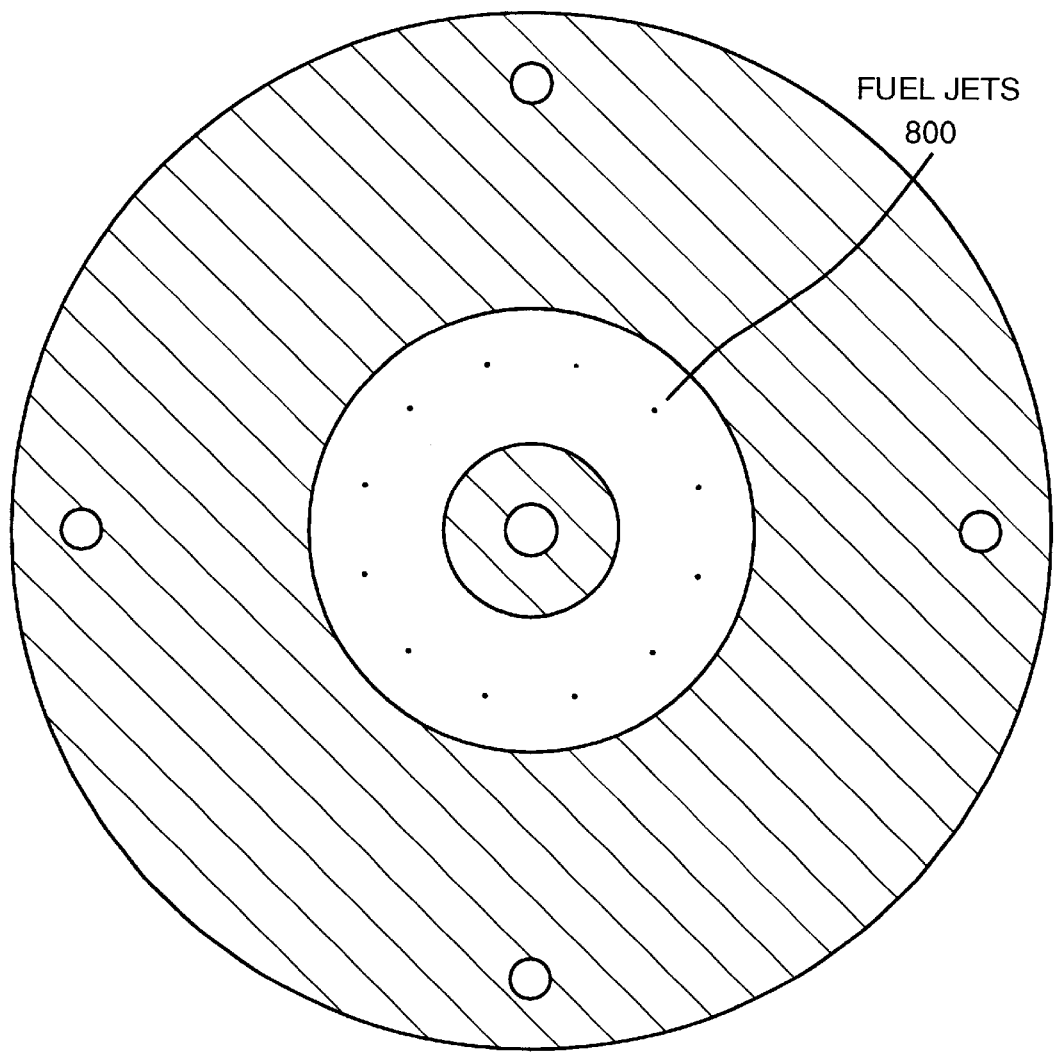
FIG. 10c is a cross sectional view from the top of the fuel intake manifold of FIG. 10a taken through cut AA, showing the fuel jet nozzles.

Referring now to FIGS. 10a–10c, an intake manifold 599 is shown for application to a Stirling cycle engine or other combustion application in accordance with an embodiment of the present invention. In accordance with a preferred embodiment of the invention, fuel is pre-mixed with air that may be heated above the fuel's auto-ignition temperature and a flame is prevented from forming until the fuel and air are well-mixed. FIG. 10a shows a preferred embodiment of the apparatus including an intake manifold 599 and a combustion chamber 610. The intake manifold 599 has an axisymmetrical conduit 601 with an inlet 603 for receiving air 600. Air 600 is pre-heated to a temperature, typically above 900 K, which may be above the auto-ignition temperature of the fuel. Conduit 601 conveys air 600 flowing inward radially with respect to combustion axis 620 to a swirler 602 disposed within the conduit 601.

FIG. 10b shows a cross sectional view of the conduit 601 including swirler 602 in accordance with an embodiment of the invention. In the embodiment of FIG. 10b, swirler 602 has several spiral-shaped vanes 802 for directing the flow of air 600 radially inward and imparting a rotational component on the air. The diameter of the swirler section of the conduit decreases from the inlet 804 to the outlet 806 of swirler 602 as defined by the length of the swirler section conduit 601. The decrease in diameter of swirler vanes 802 increases the flow rate of air 600 in substantially inverse proportion to the diameter. The flow rate is increased so that it is above the flame speed of the fuel. At outlet 806 of swirler 602, fuel 606, which in a preferred embodiment is propane, is injected into the inwardly flowing air.

In a preferred embodiment, fuel 606 is injected by fuel injector 604 through a series of nozzles 800 as shown in FIG. 10c. More particularly, FIG. 10c shows a cross sectional view of conduit 601 and includes the fuel jet nozzles 800. Each of the nozzles 800 is positioned at the exit of the swirler vanes 802 and is centralized between two adjacent vanes. Nozzles 800 are positioned in this way for increasing the efficiency of mixing the air and fuel. Nozzles 800 simultaneously inject the fuel 606 across the air flow 600. Since the air flow is faster than the flame speed, a flame will not form at that point even though the temperature of the air and fuel mixture is above the fuel's auto-ignition temperature. In a preferred embodiment, where propane is used, the preheat temperature, as governed by the temperature of the heater head, is approximately 900 K.

Referring again to FIG. 10a, the air and fuel, now mixed, referred to hereafter as "air-fuel mixture" 609, is transitioned in direction through a throat 608 which has a contoured fairing 622 and is attached to the outlet 607 of the conduit 601. Fuel 606 is supplied via fuel regulator 624.

Throat 608 has an inner radius 614 and an outer dimension 616. The transition of the air-fuel mixture is from a direction which is substantially transverse and radially inward with respect to combustion axis 620 to a direction which is substantially parallel to the combustion axis. The contour of the fairing 622 of throat 608 has the shape of an inverted bell such that the cross sectional area of throat 608 with respect to the combustion axis remains constant from the inlet 611 of the throat to outlet 612 of the throat. The contour is smooth without steps and maintains the flow speed from the outlet of the swirler to the outlet of the throat 608 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved by practice of the invention. Thus, the parasitic power drain of the combustion air fan may be minimized.

Outlet 612 of the throat flares outward allowing the air-fuel mixture 609 to disperse into the chamber 610 slowing the air-fuel mixture 609 thereby localizing and containing the flame and causing a toroidal flame to form. The rotational momentum generated by the swirler 602 produces a flame stabilizing ring vortex as well known in the art.

Figure 11:
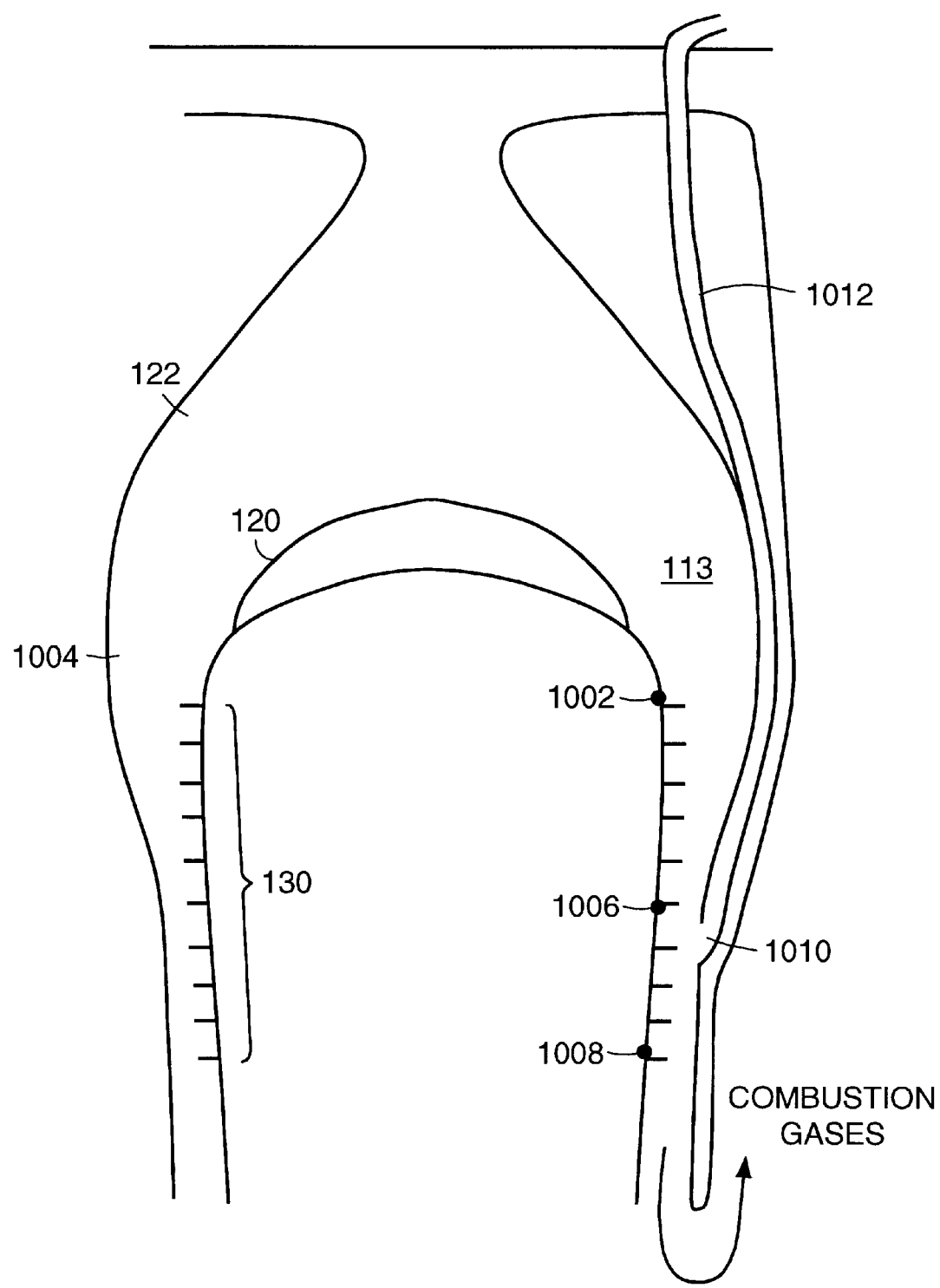
FIG. 11 is a cross sectional side view of the heater head assembly of FIG. 3 (with several heat transfer pins shown schematically for clarity) with a second combustion zone in accordance with an alternate embodiment of the present invention.

Referring to FIG. 11, a cross-section is shown of combustor 122 and exhaust gas flow path 113, as described above in reference to earlier figures. In accordance with an alternate embodiment of the present invention, it is recognized that the combustion exhaust gases remain above the temperature of combustion of the fuel well beyond the region of combustor 122, and that, since the fuel/air mixture is typically exceedingly lean, adequate oxidant remains for recombustion of the exhaust gases.

FIG. 11 further illustrates the use of a temperature sensor 1002, typically a thermocouple, to monitor the temperature of heater head 120 at the top of external pin array 130 and thereby to control the fuel flow such as to maintain the temperature at sensor 1002 below a temperature at which the heater head significantly loses strength. The temperature at sensor 1002 is preferably maintained approximately 50° C. below the melting temperature of the heater head material.

In the configuration depicted in FIG. 11, the use of a variable-cross-section gas flow bypass channel 1004 is illustrated, as described above. The taper of the bypass channel is greatly exaggerated for clarity of depiction. Even where a bypass channel is employed, the temperature profile as a function of distance from the top of the heater head is not flat, as would be preferred. Two additional temperature sensors, 1006 and 1008, are shown at the middle and bottom, respectively, of external pin array 130, whereby the temperature of the exhaust gas may be monitored.

In accordance with an alternate embodiment of the invention, additional fuel is added to the exhaust gases at nozzle 1010 via afterburner fuel line 1012. Nozzle 1010 may be a ring burner, circumferentially surrounding heater head 120 and facing external pin array 130 between the positions designated in FIG. 11 by temperature sensors 1002 and 1006. The fuel flow through afterburner fuel line 1012 may be controlled on the basis of the exhaust gas temperature measured by temperature sensor 1008. The precise position of temperature 1008 is preferably such as to measure the maximum temperature of the external pin array produced by the combustion of fuel exiting from afterburner nozzle 1010.

Figure 12A:
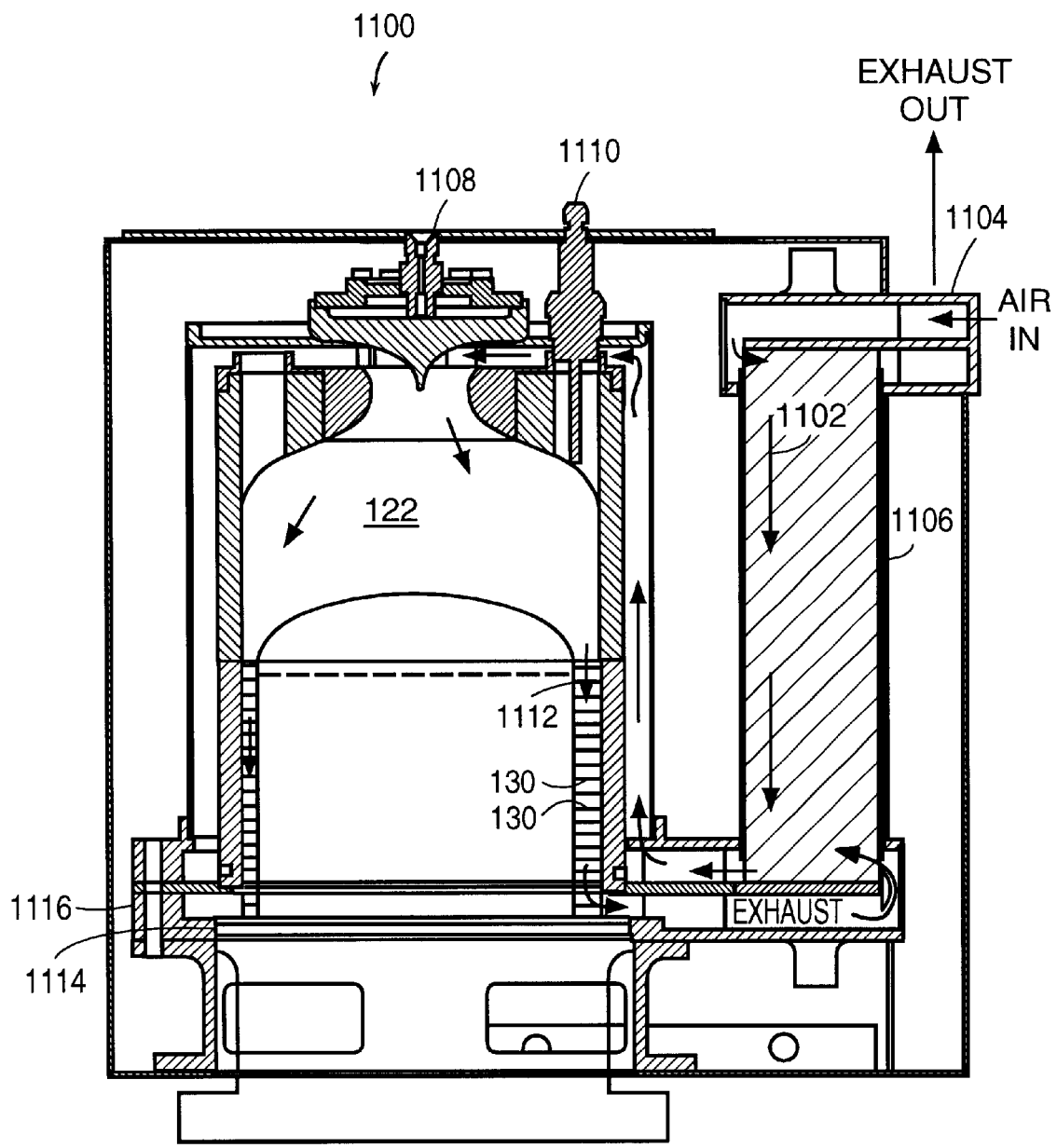
FIGS. 12a and 12b are side views in cross section of a burner and heat recovery assembly for a thermal cycle engine in accordance with an alternate embodiment of the present invention.
Figure 12B:
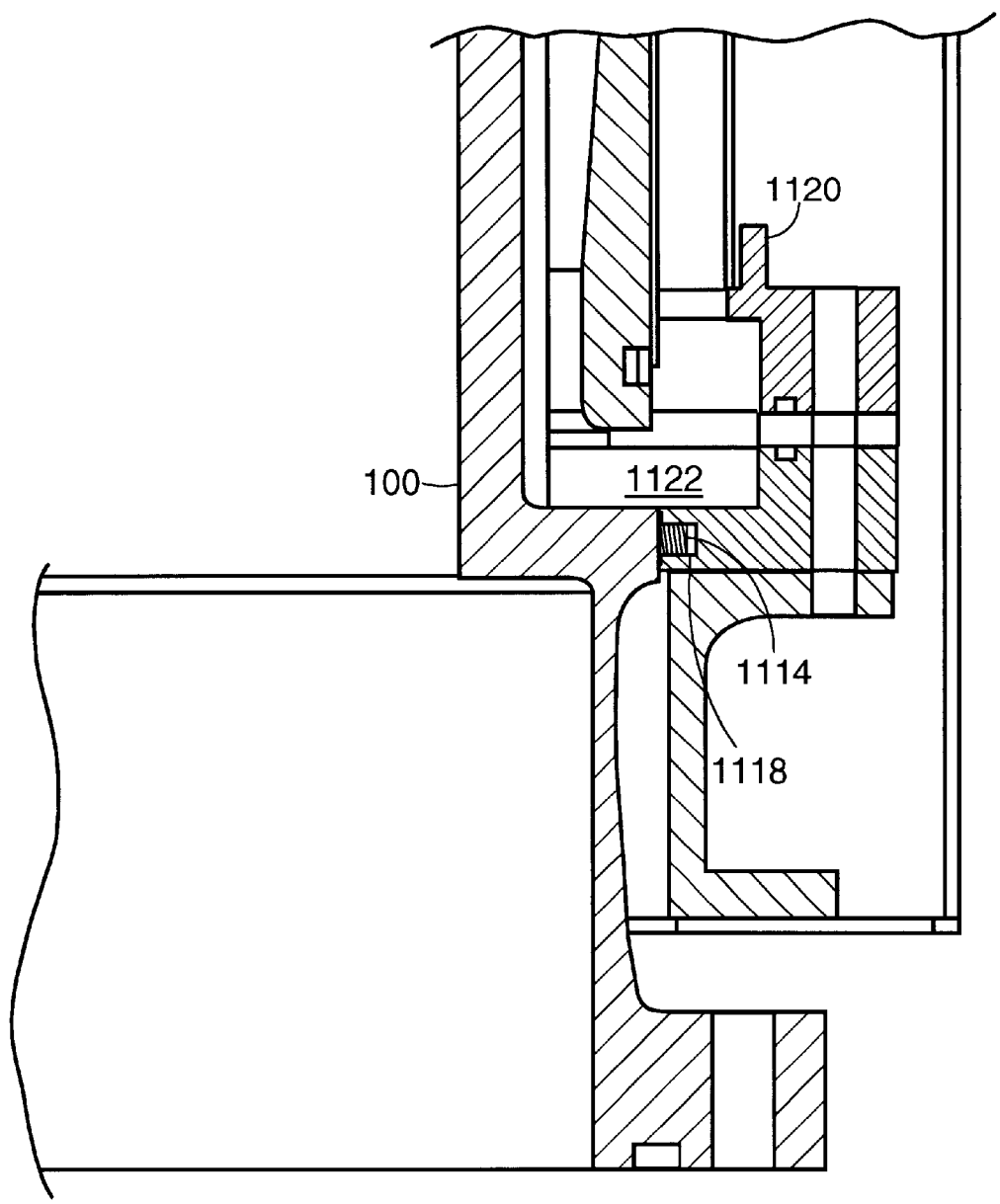

Referring to FIG. 12*a*, a side view is shown in cross section of a burner and heat recovery system, designated generally by numeral 1100, for a thermal cycle engine in accordance with an alternate embodiment of the present invention. In the embodiment shown, heat is exchanged between hot exhaust gases, heated in combustor 122, and air drawn in at air inlet 1104 in a heat exchanger 1106 that is external to the heater head assembly. Additionally shown is fuel inlet 1108 and igniter 1110 used to initiate ignition in the combustor. Exhaust stream 1112 traverses heat transfer pins 130 before being channeled to heat exchanger 1106. A seal ring 1114 of copper, or other metal of sufficiently high melting temperature, forms a rod type seal on heater head flange 1116 just below the bottom row of heat transfer pins 130. Copper ring 1114 fits tightly on heater head flange 1116 producing a labyrinth seal. The right-hand portion of the cross-sectional view of FIG. 12*a*, showing the region of the seal, is shown, enlarged, in FIG. 12*b*. Copper seal ring 1114 fits tightly on heater head 100 and has a close fit within annular groove 1118 on the bottom surface of burner cover 1120. The configuration of ring 1114 in groove 1118 produces a labyrinth seal causing the exhaust gas, in exhaust plenum 1122 to travel a convoluted path around the back side of seal ring 1114 thereby limiting exhaust gas leakage. The tight fit of ring 1114 onto head 100 limits exhaust gas leakage axially out of the burner.

The devices and methods described herein may be applied in other applications besides the Stirling engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. In a thermal cycle engine of the type having a piston undergoing reciprocating linear motion within an expansion cylinder, the expansion cylinder having a cylindrical wall and containing a working fluid heated by conduction through a heater head of heat from an external thermal source, the improvement comprising:

a heat exchanger for transferring thermal energy across the heater head from a heated external fluid to the working fluid, the heat exchanger comprising a set of heat transfer pins and a plurality of dividing structures for spatially separating the set of heat transfer pins into subsets of heat transfer pins.

2. The thermal cycle engine of claim 1, wherein the heat transfer pins of each subset of heat transfer pins have axes that are substantially parallel to each other.

3. In a thermal cycle engine of the type having a piston undergoing reciprocating linear motion within an expansion cylinder, the expansion cylinder having a cylindrical wall and containing a working fluid heated by conduction through a heater head of heat from an external thermal source, the improvement comprising:

a heat exchanger for transferring thermal energy across the heater head from a heated external fluid to the working fluid, the heat exchanger comprising a set of heat transfer pins, each heat transfer pin characterized by a height and diameter, where the height and diameter of a subset of the set of heat transfer pins, up to the entirety thereof, varies along a direction of a flow path of the external fluid, the heat transfer pins extending from the heater head into the external fluid.

4. In a thermal cycle engine of the type having a piston undergoing reciprocating linear motion within an expansion cylinder, the expansion cylinder having a cylindrical wall and containing a working fluid heated by conduction through a heater head of heat from an external thermal source, the improvement comprising:

a heat exchanger for transferring thermal energy across the heater head from a heated external fluid to the working fluid, the heat exchanger comprising a set of heat transfer pins having a set of characteristics, at least one characteristic varying in a direction of a flow path of the external fluid; and a pin backer for guiding the heated external fluid in the flow path characterized by a direction past the set of heat transfer pins.

5. In a thermal cycle engine of the type having a piston undergoing reciprocating linear motion within an expansion cylinder, the expansion cylinder having a cylindrical wall and containing a working fluid heated by conduction through a heater head of heat from an external thermal source, the improvement comprising:

a heat exchanger for transferring thermal energy across the heater head from a heated external fluid to the working fluid, the heat exchanger comprising a set of heat transfer pins; and a pin backer for guiding the heated external fluid in a flow path characterized by a direction past the set of heat transfer pins, the pin backer having a dimension perpendicular to the heater head that decreases in the direction of the flow path.

6. The thermal cycle engine of claim 4, wherein the set of characteristics of the heat transfer pins includes a surface area transverse to the flow path that increases in the direction of the flow path.

7. The thermal cycle engine of claim 4, wherein the set of characteristics of the heat transfer pins includes a population density that increases in the direction of the flow path.

8. The thermal cycle engine of claim 4 wherein the set of characteristics of the heat transfer pins includes a height and density that varies with distance in the direction of the flow path.

9. In a thermal cycle engine of the type having a piston undergoing reciprocating linear motion within an expansion cylinder, the expansion cylinder having a cylindrical wall and containing a working fluid heated by conduction, through a heater head, of heat from an exhaust gas of an external combustor having a fuel supply, the improvement comprising:

a. a thermal sensor for measuring a temperature of the heater head at a point of maximum temperature of the heater head.

10. A thermal cycle engine in accordance with claim 9, wherein the thermal sensor is a thermocouple.

11. A thermal cycle engine in accordance with claim 9, further comprising a fuel regulator for regulating the fuel supply on the basis of at least the temperature of the heater head at the point of maximum temperature.

12. In a thermal cycle engine of the type having a piston undergoing reciprocating linear motion within an expansion cylinder, the expansion cylinder having a cylindrical wall and containing a working fluid heated by conduction, through a heater head, of heat from an exhaust gas of an external combustor having a fuel supply, the improvement comprising:

a. a secondary ring burner for supplying additional fuel to cause additional combustion of the exhaust gas.

* * * * *